Sept. 17, 1935.  B. DYSART  2,014,561

CALCULATING MACHINE

Filed April 5, 1929  12 Sheets-Sheet 2

Sept. 17, 1935.  B. DYSART  2,014,561
CALCULATING MACHINE
Filed April 5, 1929  12 Sheets-Sheet 3

Inventor.
Birney Dysart,
by Hippey Mingiland.
His Attorneys.

Sept. 17, 1935.    B. DYSART    2,014,561
CALCULATING MACHINE
Filed April 5, 1929    12 Sheets-Sheet 4

Fig. 4.

Inventor:
Birney Dysart,
by Rippey & Kingsland
His Attorneys.

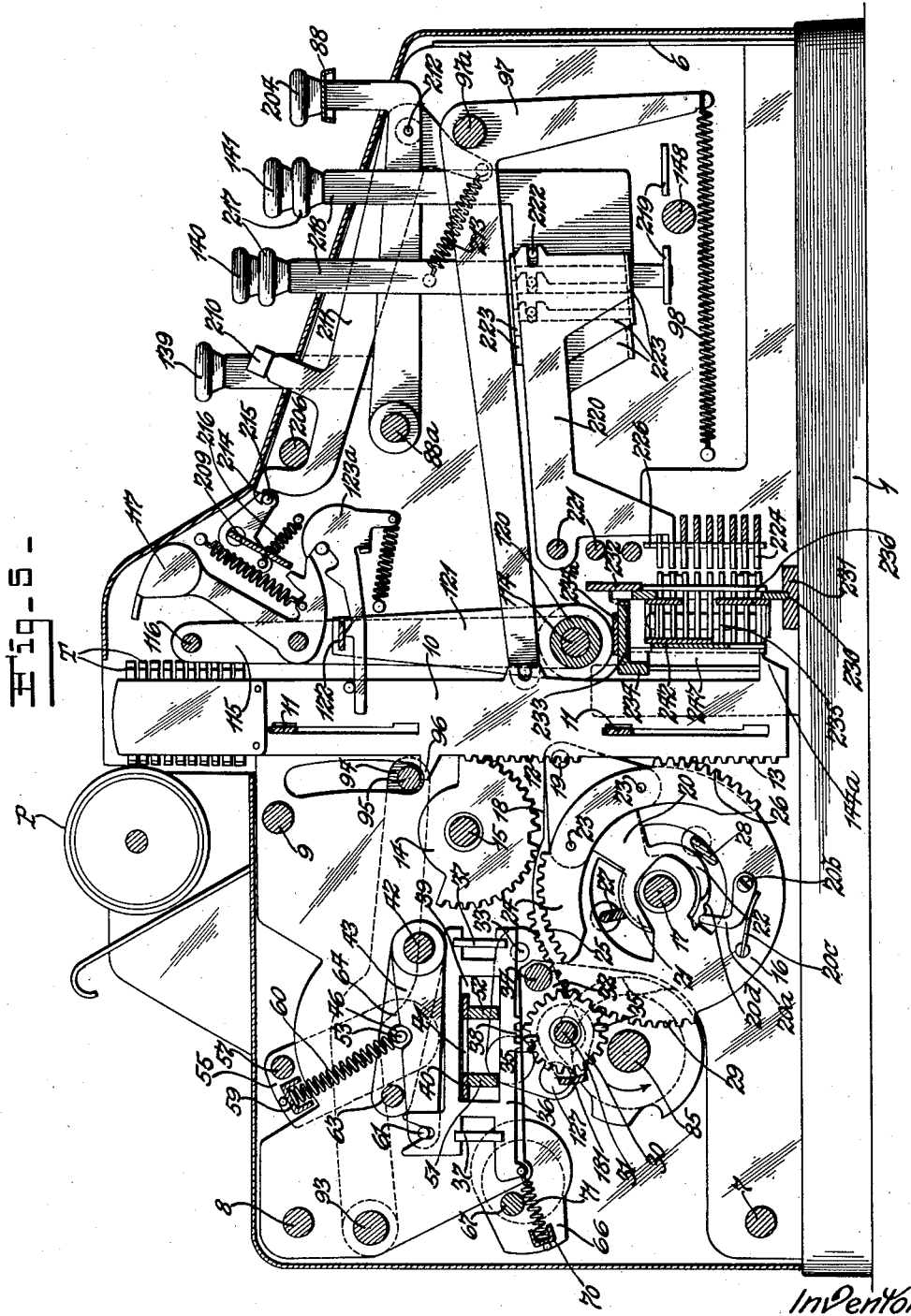

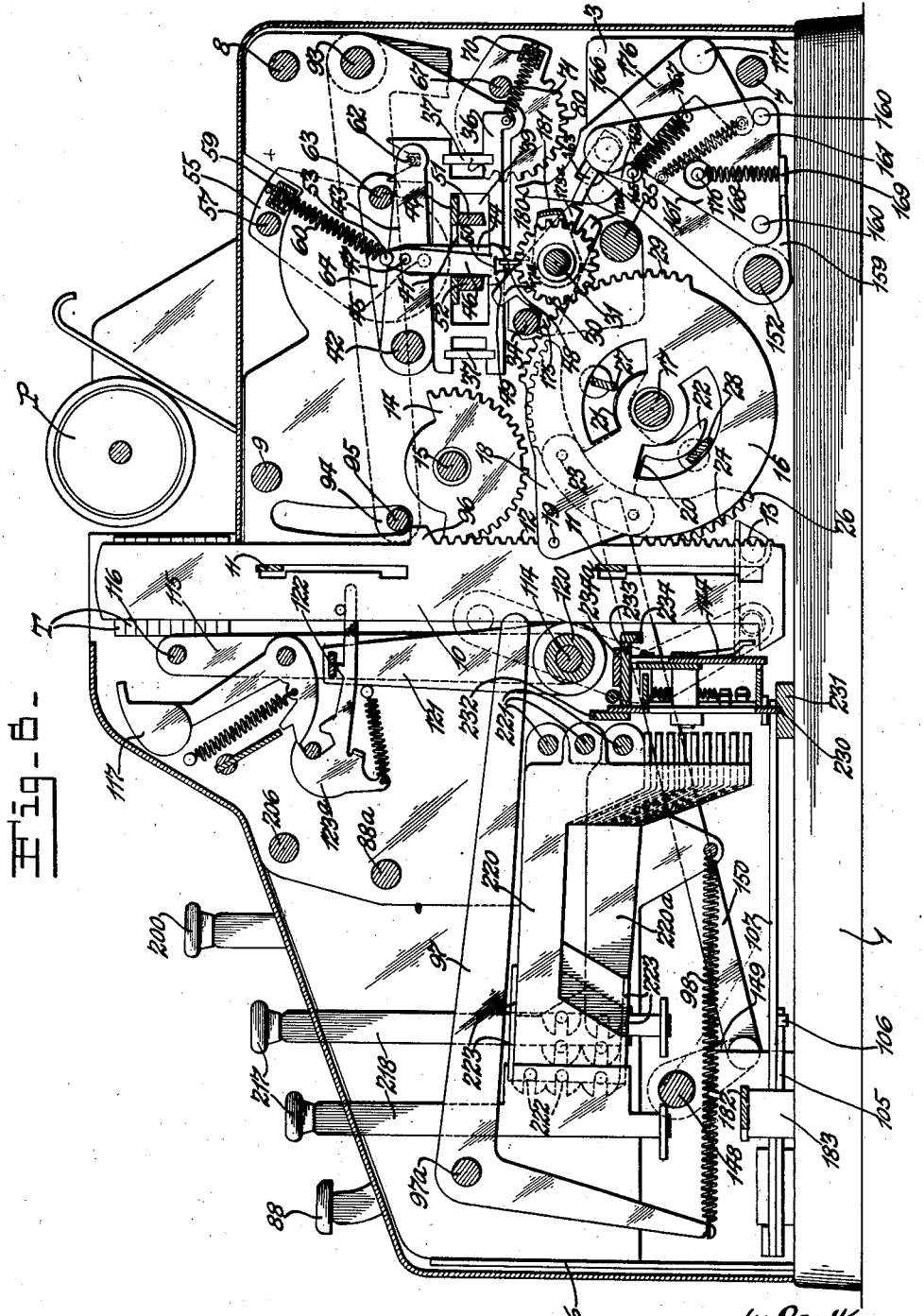

Sept. 17, 1935.   B. DYSART   2,014,561
CALCULATING MACHINE
Filed April 5, 1929   12 Sheets-Sheet 7
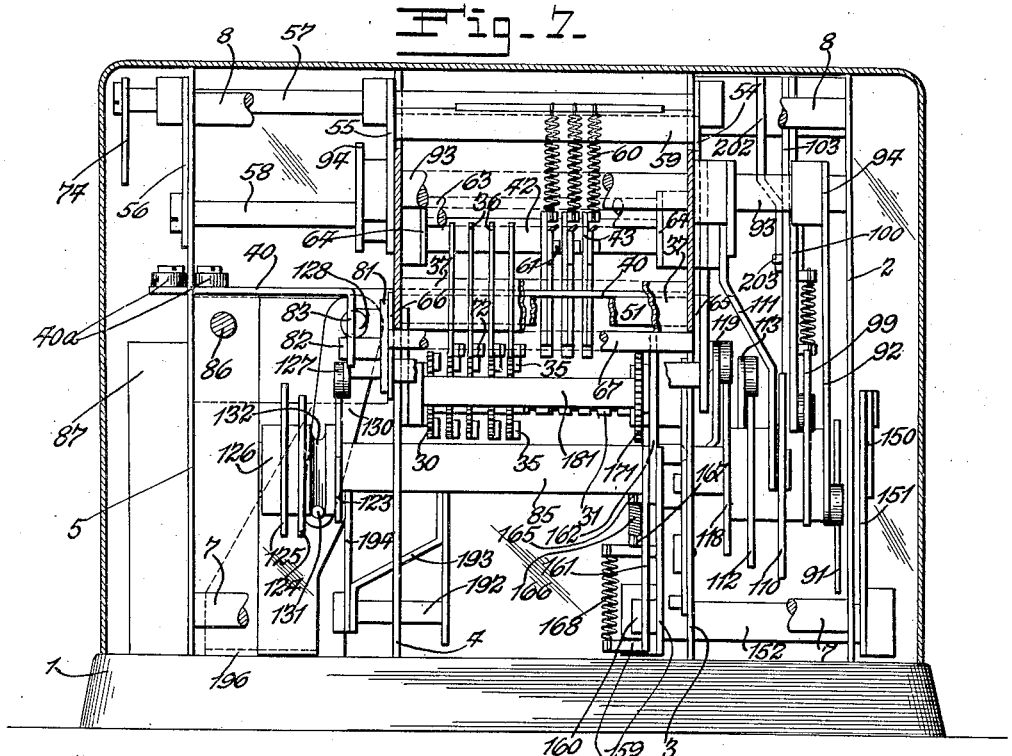
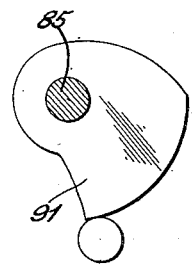
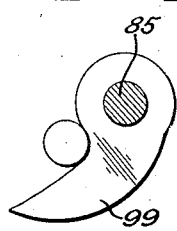
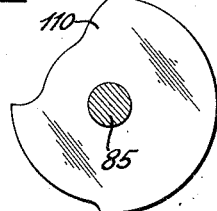
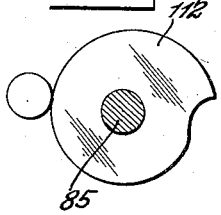
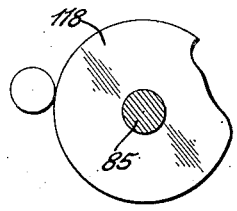
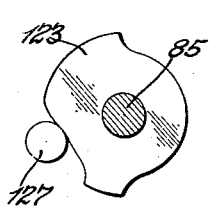
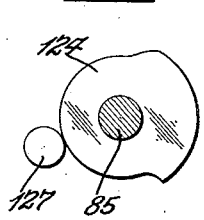
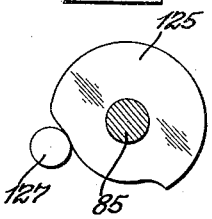
Inventor:
Birney Dysart,
by Rippey & Kingsland
His Attorneys.

Sept. 17, 1935.  B. DYSART  2,014,561
CALCULATING MACHINE
Filed April 5, 1929   12 Sheets-Sheet 8
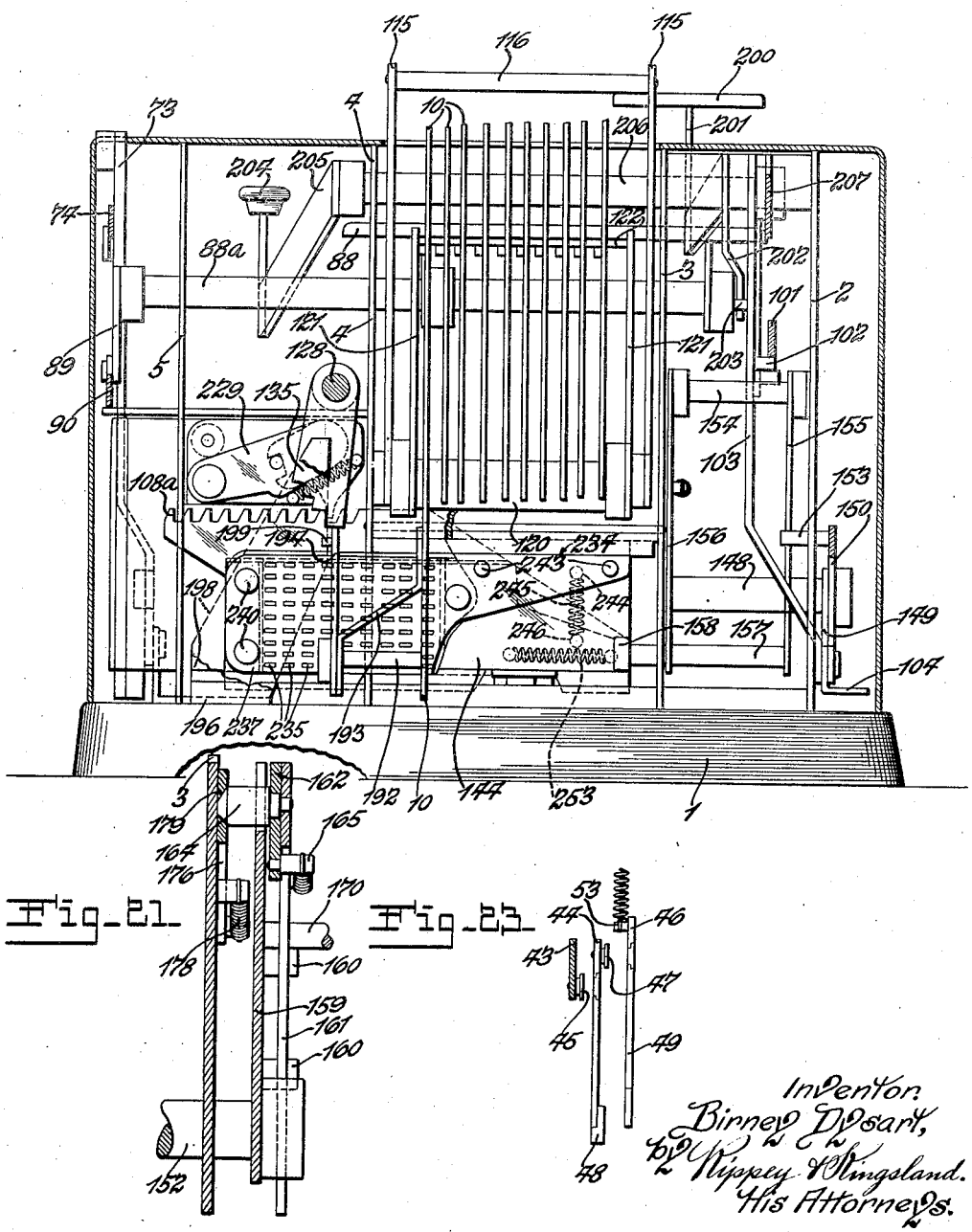

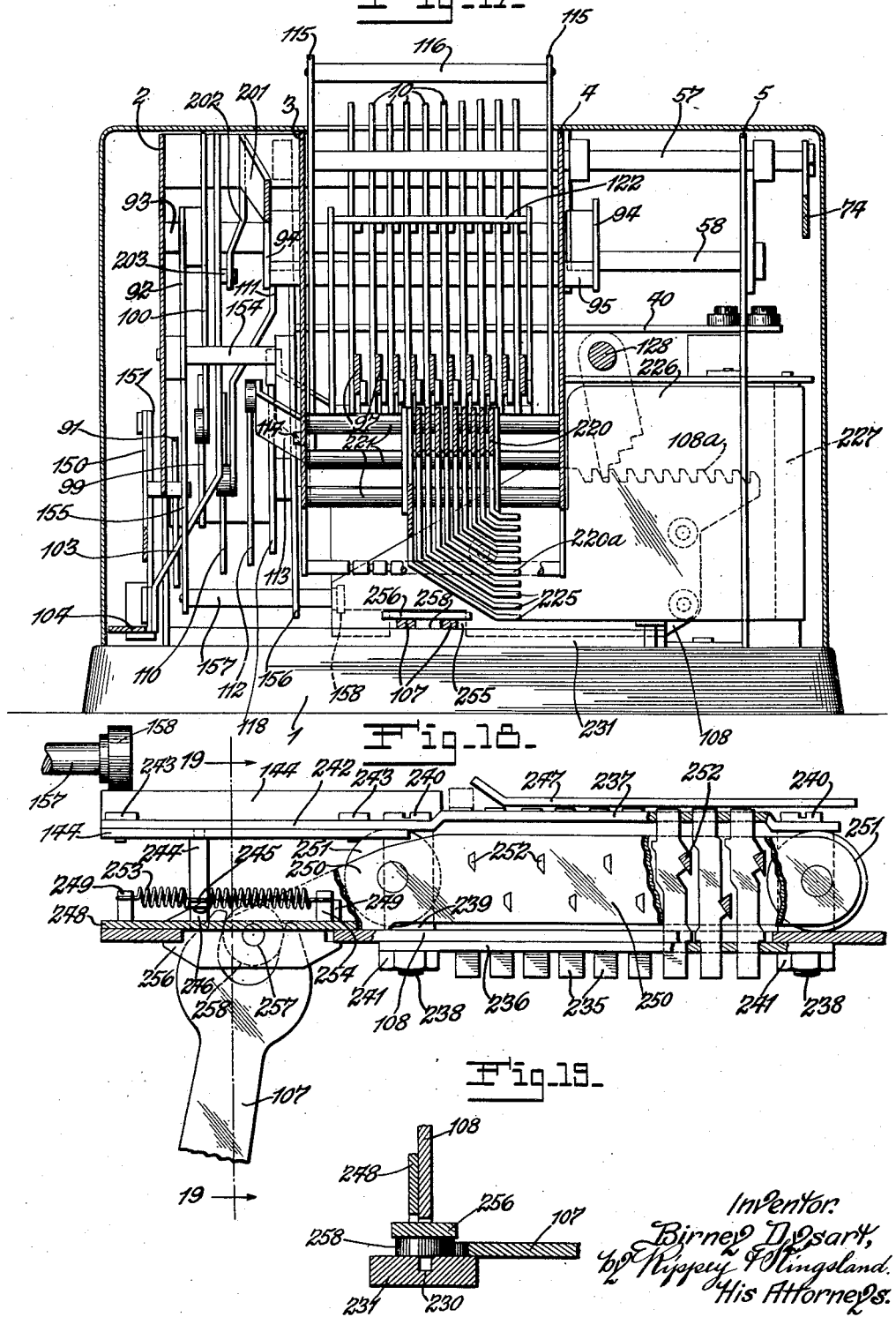

Fig. 20.

Sept. 17, 1935.  B. DYSART  2,014,561
CALCULATING MACHINE
Filed April 5, 1929  12 Sheets-Sheet 11

Inventor.
Birney Dysart,
by Nippey & Kingsland.
His Attorneys.

Sept. 17, 1935.  B. DYSART  2,014,561
CALCULATING MACHINE
Filed April 5, 1929   12 Sheets-Sheet 12

Inventor.
Birney Dysart,
by Rippey & Kingsland,
His Attorneys.

Patented Sept. 17, 1935

2,014,561

UNITED STATES PATENT OFFICE 2,014,561

CALCULATING MACHINE

Birney Dysart, West Hartford, Conn.; Eva Perin Dysart, executrix of said Birney Dysart, deceased, assignor to Eva Perin Dysart, West Hartford, Conn.

Application April 5, 1929, Serial No. 352,651

95 Claims. (Cl. 235—60)

This invention relates to calculating machines, and the invention has special reference to that type of calculating machines that are provided with algebraic totalizers; and some of the improvements herein disclosed constitute specific or generic advances and improvements upon the invention disclosed in my prior application Serial No. 565, filed January 5, 1925.

Objects of the invention include the provision of an improved algebraic totalizer having flat or radial abutment surfaces for alining the computing pinions at their zero positions, thus making it possible to design and construct commercially efficient machines of this type considerably reduced in size and weight from the size and weight of the known types of calculating machines in use and which embody algebraic totalizers.

Another object of the invention is to provide such a machine with a totalizer in which transferring is effected by the transfer devices in such a way that no extra or transferring stroke of the machine is necessary in order to condition the machine for taking a total at any time.

A further object is to provide a machine of the type mentioned, in which the totalizer comprises computing pinions which have but two positions and are capable of actuating the transfer devices in either of said positions.

Another object of the invention is to provide a calculating machine with novel, simple and effective means for reversing the direction of movement of the actuating device of the computing pinions as required in making positive and negative computations or calculations.

Another object of the invention is to provide a machine of the character and type mentioned comprising improvements in the mechanisms for taking sub-totals; in the mechanisms for taking a grand total; in the mechanisms for disabling or rendering ineffective the adding function of the machine when items are listed, and in the mechanisms for accumulating numbers.

Another object of the invention is to provide a machine with special means for printing designating or characterizing symbols in association with different numbers and items listed and with totals and sub-totals etc., so as to/distinguish the lists from each other.

For convenience of illustration, the invention is shown embodied in a machine of the cross-carriage type although it will be apparent that many of the improvements might as well be embodied in other types of machines.

In the type of machine illustrated I have provided a transversely movable differential stop-carriage of highly refined and improved construction and mode of operation, and in which the digit stops are held in their set. and unset positions by a single spring actuated detent element and which detent element is automatically disengaged from the digit stops as an incident to movement of the carriage to its starting position.

Various other objects and advantages of my machine and different features and elements thereof will appear from the following description, reference being made to the accompanying drawings in which:

Fig. 4 is a right hand elevation view with the case shown in section and the right-hand side plate removed.

Fig. 5 is a sectional view on the line 5—6 of Fig. 2, looking from the left.

Fig. 6 is a sectional view on the line 5—6 of Fig. 2, looking from the right.

Fig. 7 is a rear elevation view, the case being in section and some of the cross-shafts being broken away.

Fig. 8 shows the cam for controlling the type-carrying plates as seen from the left.

Fig. 9 shows the cam for returning the stop-carriage as seen from the left.

Fig. 10 shows the cam for restoring and controlling the carrying racks as seen from the left.

Fig. 11 shows the cam for restoring the printing hammers as seen from the left.

Fig. 12 shows the cam for firing the printing hammers as seen from the left.

Fig. 13 shows the cam for controlling operation of the machine in adding or subtracting as seen from the left.

Fig. 14 shows the cam for taking a grand total as seen from the left.

Fig. 15 shows the cam for "non-adding" or disabling the accumulative function of the machine as seen from the left.

Fig. 16 is a transverse sectional view on the line 16—16 of Fig. 2 as seen from the rear.

Fig. 17 is a transverse sectional view of the line 17—17 of Fig. 2 looking from the front.

Fig. 18 is a detail plan view of a portion of the stop-carriage on an enlarged scale, with portions broken away to show some of the stops and the stop detent device.

Fig. 19 is a detail sectional view on line 19—19 of Fig. 18, looking from the left, to show the mechanism for disabling the stop detent device during movement of the stop-carriage toward idle position.

Fig. 20 is an enlarged scale sectional view of the rear portion of the machine on the line 5—6 of Fig. 2, as seen from the right, and showing the parts adjusted for addition.

Fig. 21 is a fragmentary sectional view on the line 21—21 of Fig. 20, looking in the direction of the arrow.

Figure 22:
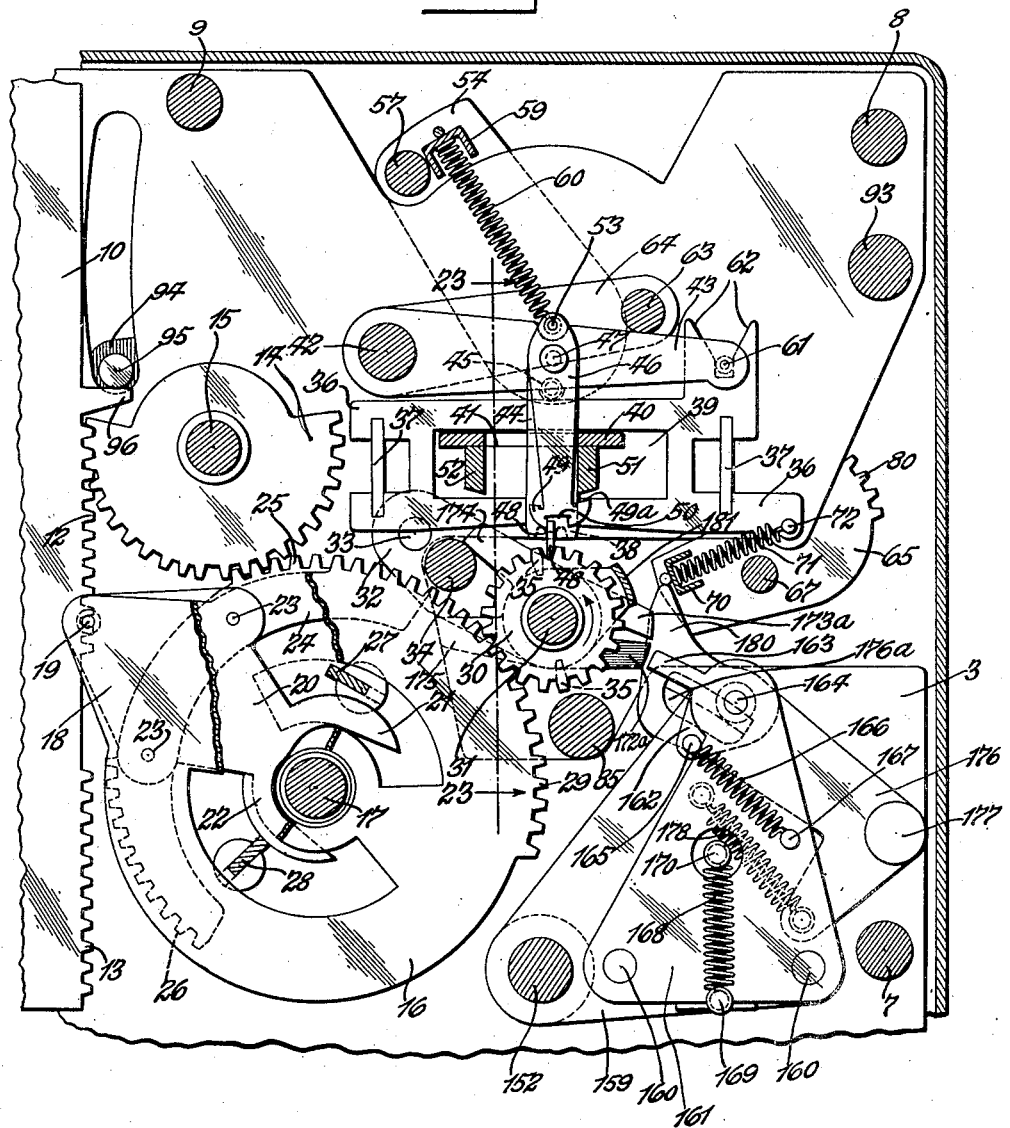
Fig. 22 is a view similar to Fig. 20 showing the parts adjusted for subtraction.

Fig. 23 is a fragmentary sectional view on the line 23—23 of Fig. 22, looking in the direction of the arrow and showing an edge view of the levers 44 and 46 somewhat separated for clarity, and illustrating manner of their attachment to the lever 43 shown in section.

Figure 24:
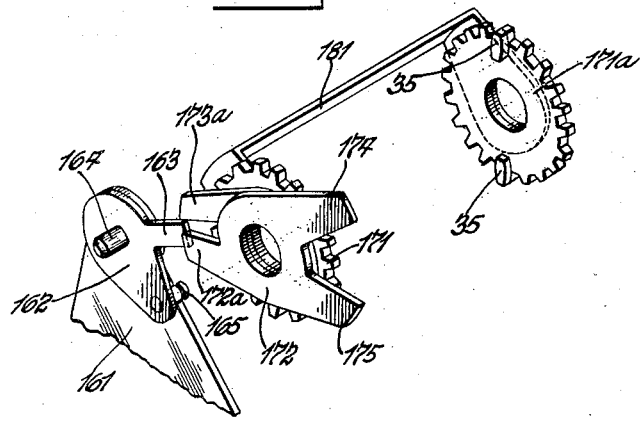

Fig. 24 is a perspective view of some of the parts for locking the total and sub-total keys and for introducing the "fugitive one" into units denominational order.

Figure 25:
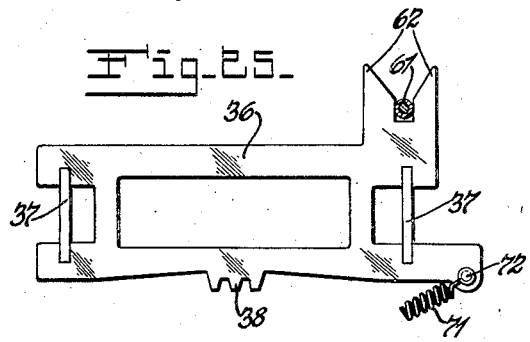

Fig. 25 is a left-hand elevation of one of the racks for actuating the adding pinions to carry.

Figure 26:
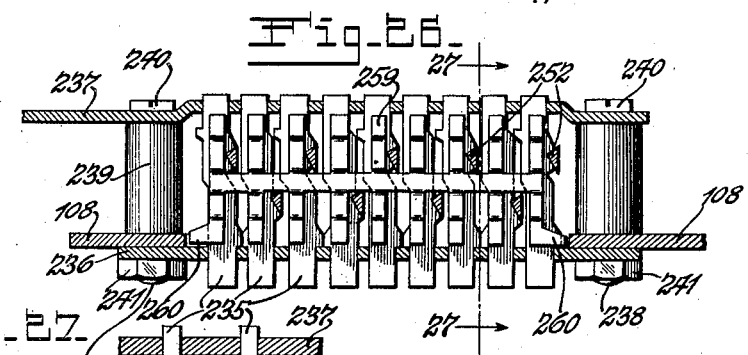

Fig. 26 is a horizontal sectional view of the stop carriage showing a frictional detent device.

Figure 27:
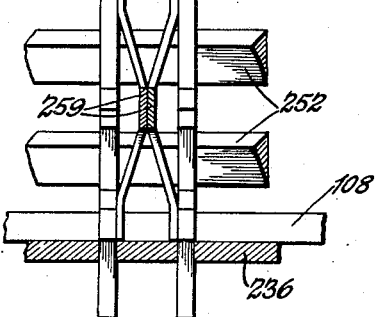

Fig. 27 is an enlarged sectional view on the line 27—27 of Fig. 26.

The computing mechanisms

On the base 1, vertical plates 2, 3, 4 and 5 are securely mounted. The four plates are connected at their forward ends by the cross-plate 6, and elsewhere by suitable cross-rods, such as 7, 8 and 9. A series of ten type-carrying slide plates 10 are mounted for vertical movement on transverse supports 11 (Fig. 5). An upper series of rack teeth 12 and a lower series of rack teeth 13 are formed on the rear edges of all but the right-hand one of the plates, it being left blank. A series of rack-segments 14 are mounted on the shaft 15 and spaced to engage with the racks 12. A series of rack-discs 16 are mounted on the shaft 17, but are spaced a small distance to the right of their corresponding segments 14 and racks 13 on the slide plates 10. Each of the rack-discs 16 has a projecting portion 18 extending into the space between the plates 10 a short distance, by means of a stud 19 on the left side of the projection 18 a member 20 having a forked end is mounted. The tines 21 and 22 of the fork on the free end of the member 20 embrace the shaft 17, the tines being so spaced as to permit a small oscillating movement of the member 20 on its stud 19. In any suitable manner as by rivets 23 there are secured to the left-hand side of the members 20 curved plates 24 carrying at each end on their outside edges two non-concentric rack segments 25 and 26. These segments are in the same respective vertical planes as the rack teeth 13 on the plates 10 and the rack segments 14. When the members 20 are oscillated so that the tines 21 are in contact with the shaft 17 the rack segments 26 as well as the outer edges of the tines 21 will be concentric with the shaft 17 and the former will be in meshed relation with the rack teeth 13; but the rack segments 25 will be below and out of contact with the segments 14. In this adjustment the rack discs 16 will be directly driven by the sliding plates 10 through the rack teeth 13. When, however, the members 20 are oscillated upwardly until the tines 22 engage with the shaft 17, the rack segments 26 will be drawn away from and out of engagement with the rack teeth 13 and the rack segments 25 will be engaged with the rack segments 14, the racks 25 and the exterior edges of the tines 22 being now concentric with the shaft 17. In this adjustment the rack-discs 16 will be driven indirectly by the plates 10 through the rack teeth 12 and the segments 14, the direction of movement being, of course, just the reverse of the previous adjustment.

The members 20 are oscillated and held in either of their two positions described by means of two transverse blades 27 and 28, which pass through suitable slots in the rack-discs 16 and are suitably actuated by means hereafter to be described. It might here be suggested, however, that the blades 27 and 28 are geared together so that they always revolve synchronously and to the same extent, one being turned with its edge toward the member 20 while the other is moved so that its edge is pointed at approximately right angles. As heretofore explained, when either of the series of tines 21 or 22 are in engagement with the shaft 17, the outside edges thereof are concentric with the shaft. The members 20, the rack members 24 and the rack-discs 16 may thus oscillate freely on the shaft 17 in either of the described adjustments of the members 20, the edges of the tines constituting bearings and sliding over the edges of the blades 27 or 28.

It will be observed that the upper rearward portions of the rack-discs 16 are provided with a series of rack teeth 29. A series of computing pinions 30 are mounted on a shaft 31 carried in a cradle or bail 32 pivoted at 33 and connected by a tie-shaft 34 to secure rigidity. The series of pinions 30 are mounted in such position that they may engage the series of rack teeth 29 intermediately of their extent. In the present instance, there are 20 teeth and two carrying abutment lugs 35 on each computing pinion. In the idle or normal position of the machine, the pinions 30 are in engagement with the rack teeth 29.

Figure 2:
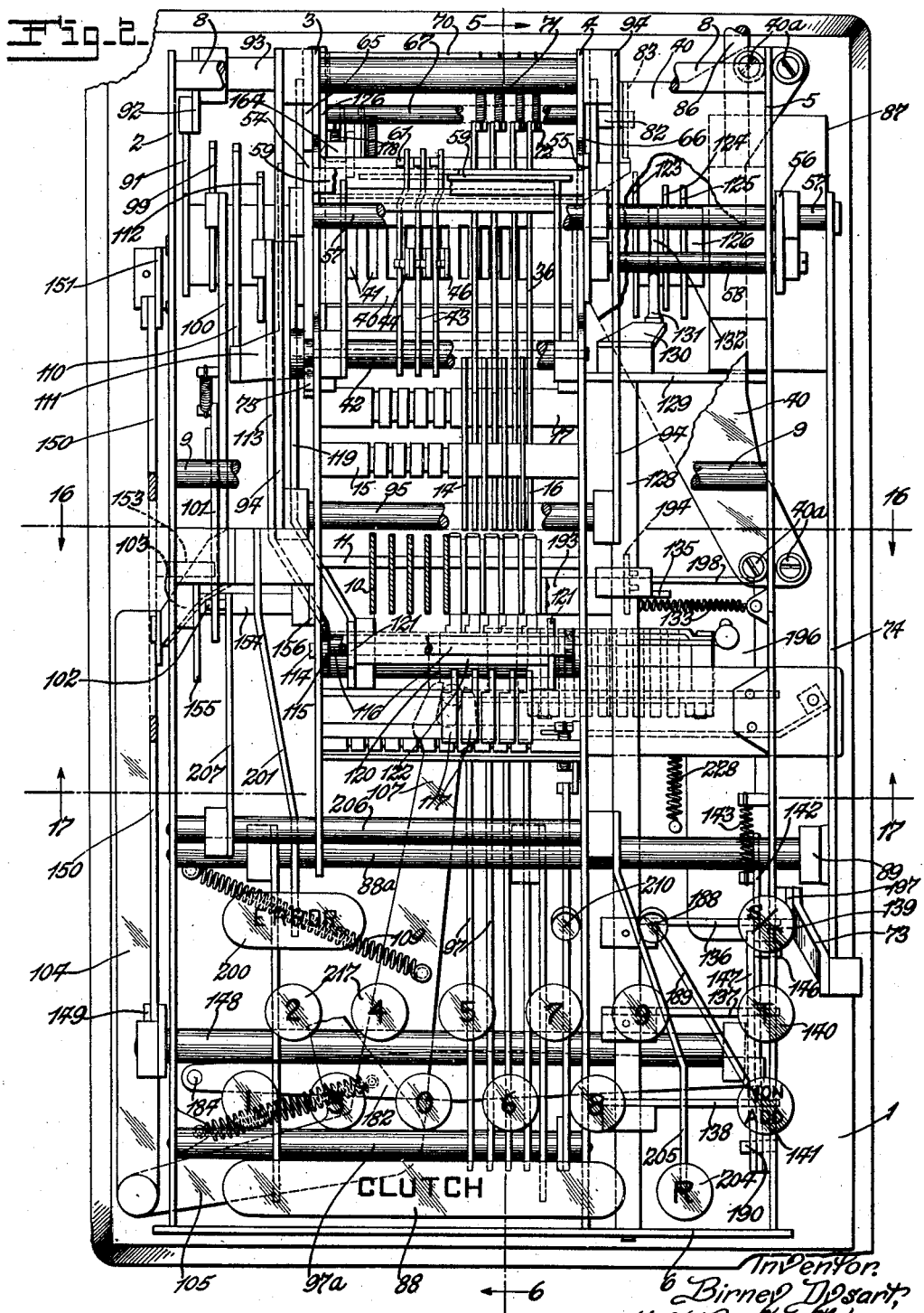
Fig. 2 is a plan view with the top of the case and most of the printing mechanism omitted. About half of the trains of some of the mechanisms have been omitted, and for clarity a few of the upper parts of these, such as parts 43, 44 and 46, have been omitted in the right hand orders and shown moved over into higher orders.

Above and in vertical alinement with the computing pinions 30 are a series of carrying racks 36 suitably mounted for short and definitely limited movements forwardly and rearwardly on spaced transverse bars 37. Each carrying rack is provided on its lower edge with three carrying teeth 38 for engagement with and actuation of one of the series of computing pinions 30 (seen in broken lines in Figs. 20 and 22 and in full lines in Fig. 5). An opening 39 is formed in each of the carrying racks, through which projects from the right a plate 40 (Figs. 2, 7 and 22). As seen in Fig. 2, this left-hand portion of the plate 40 has a series of elongated openings or slots 41 arranged in vertical registry with the carrying lugs 35. It will be understood that the plate 40 is accurately mounted and guided in the short movement it has by means of anti-friction rollers 40a engaging with both sides of the plate 5.

On a transverse shaft 42 a series of levers 43 are mounted in such position that one of the levers is above and just to the left of each of the openings 41 (Figs. 2 and 7). A depending lever or pawl 44 is mounted on the right-hand side of each of the levers 43 by means of a stud 45, and a second depending lever 46 is mounted on the right-hand side of each of the levers 44 by means of a stud 47 located a short distance above the studs 45. The levers of each pair of levers 44 and 46 are in close contact with each other and extend downwardly through one of the slots 41 in the plate 40. At its lower extremity each of the levers 44 has a transverse web or blade 48 of greater thickness than the other portions of the lever, while the lower end of each of the levers 46 is provided with two hook portions 49 and 49a, terminating with a recess or opening 50 formed in its end. As assembled, the upper edge of the web 48 on the levers 44 enters the recess 50 which is enough wider than the thickness of the blade 48 to permit a small extent of relative movement between each pair of levers 44 and 46. Secured to the under side of the plate 40 are two transverse bars 51 and 52, their inner edges being flush with the ends of the slots 41.

Figure 20:
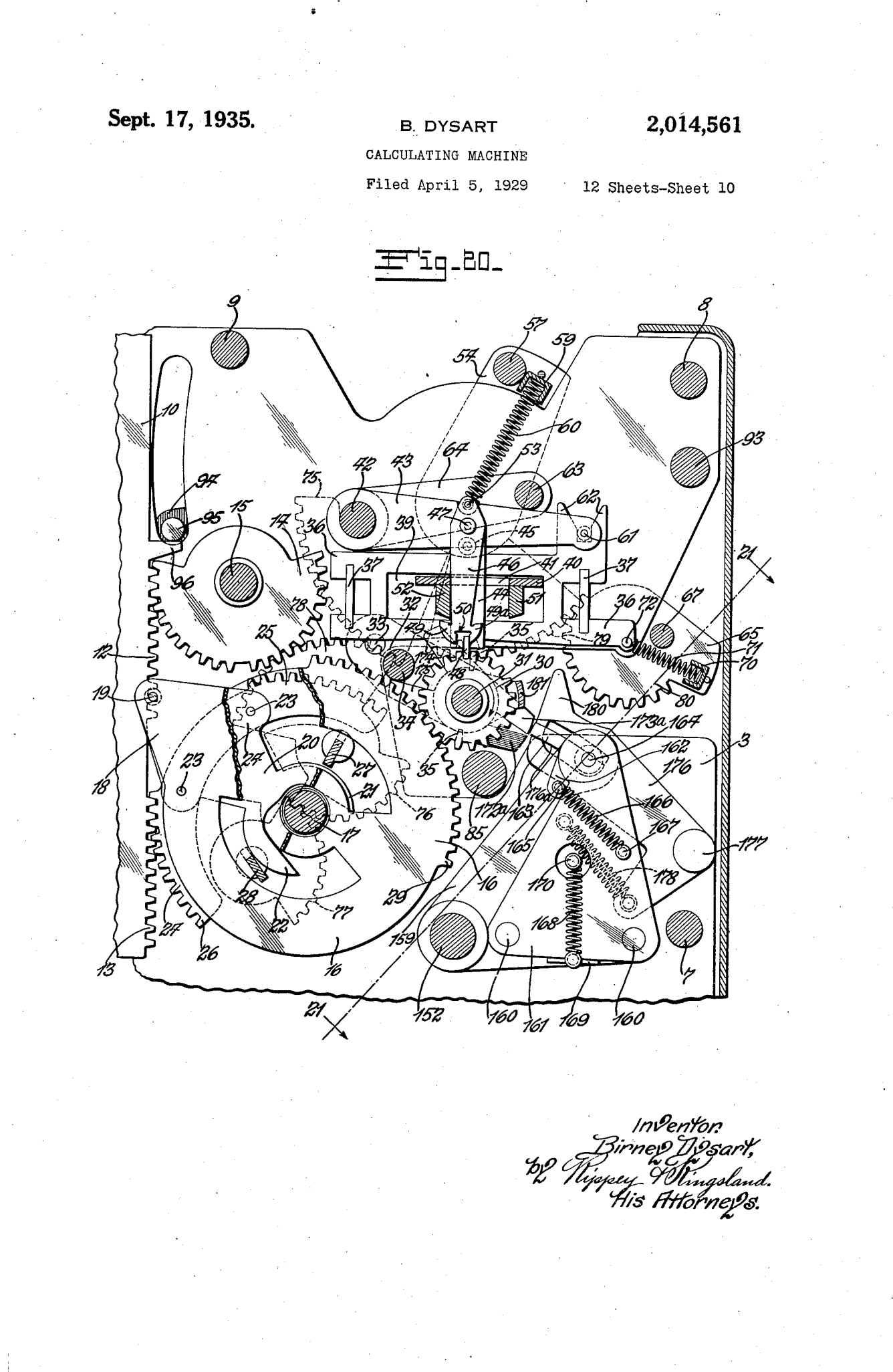

The plate 40 has two positions forwardly and rearwardly in the machine, the rearward position (which is seen in Fig. 20) being that for addition, and the forward position (seen in Fig. 22) being for subtraction. Means will later be described for moving the plate 40 from one of these positions to the other and for holding it securely and accurately in either.

The levers 44 are of such length that their blades 48 extend to and engage with the carrying lugs 35 when the latter reach their uppermost positions. This engagement takes place even when the computing pinions 30 are out of engagement with the carrying rack teeth 38. As the blades 48 do not extend over the computing pinions but lie wholly between them, they pass by the lugs 35 when the computing pinions engage with the carrying racks.

At is upper end each of the levers 46 is provided with a spring stud 53 projecting toward the left. A bail formed of three pivoted vertical plates 54, 55 and 56, a transverse shaft 57 and a pivotal shaft 58 connecting the plates 55 and 56, is provided with a spring support 59 carried between the free ends of the plates 54 and 55. It may be explained that the plate 54 is separately mounted on its own pivotal stud on the plate 3, the stud being in alinement with the shaft 58 and also with the series of studs 53. A series of springs 60 mounted on the spring support 59 are connected at their lower ends to the studs 53 and yieldingly draw the levers 43 upwardly.

The spring support 59 is shiftable by its bail to a rearward position for addition and to a forward position for subtraction by means presently to be described. In the adding position as seen in Fig. 20, by reason of the relative positions of the pivotal studs 45 and 47, the lower ends of both the levers 44 and 46 will be yieldingly held toward the left or front of the machine and in contact with the bar 52. In the elevated position of the levers 43 the point of the hook 49 (when in adding adjustment) will ride against the right-hand side or inner surface of the bar 52. When, however, the levers are depressed almost to their lowermost position the point of the hooks 49 will be carried past the lower edge of the bar 52 and the hooks will then be moved to the left below and into the path of the bar 52, by the action of the springs 60 as just explained, so that the levers 43 will be latched and held depressed against the tension of the springs 60, by the hooks 49 on the levers 46.

The free end of each of the levers 43 carries on its left-hand side a stud 61. At their rear ends these levers 43 are slightly offset toward the right, which places the studs 61 directly over and in registry with the series of carrying racks 36. Directly below the studs 61 a double cam 62 is formed in an upward extension on each carrying rack, there being a deep dwell or notch at the bottom of the cams. A bail formed by the shaft 42, the shaft 63 and side plates 64 is arranged so that the shaft 63 overlies and is adapted to depress the free ends of the series of levers 43 in opposition to the springs 60, and to force the studs 61 into the cams 62 on the carrying racks for the purpose of restoring the latter to their central or unoperated position and retaining them therein until carrying action is necessary.

The lower edges of the bars 51 and 52 are so formed that when one of the bars is in position adjacent to the depending levers 44 and 46 its under edge will be concentric with the studs 47. In the normal or idle position of the machine the shaft 63 is in its lowermost position in which the studs 61 are low down in the central recess or dwell between the cams 62. In this position the hooks 49 or 49a on the depending levers 46 are a little below the lower edges of the bars 51 and 52. This permits a change in adjustment of the bars 51 and 52 as required in shifting from the adding to the subtracting position, or vice versa, to be made freely and with no interference of any kind.

Prior to the period in the operation of the machine when the computing pinions are operated to add or subtract the shaft 63 is raised very slightly, but not sufficiently to bring the studs 61 above the dwell in the cams 62.

In the adding adjustment of the bars 51 and 52, as shown in Fig. 20, the computing pinions are turned in a clockwise direction, and when 9 units have been registered on a pinion one of its carrying lugs 35 will stand immediately to the left of the blade 48 on its depending lever 44. Further movement of the pinion in a clockwise direction incident to the addition of a further amount will now result in movement of the lever 44 and with it the lever 46 to the right a distance sufficient to disengage the hook 49 from the bar 52. The spring 60 will then elevate the levers 44, 46 and 43 a very slight distance only, when they will be arrested through the lever 43 engaging the shaft 63.

After direct actuation of the pinions 30 in adding or subtracting by the rack teeth 29 is complete, the pinions are moved into engagement with the carrying racks 36, immediately following which the shaft 63 is moved upwardly entirely out of the way of the levers 43. Those of the levers 43 whose hooks 49 have been released from engagement with the bar 52 in the manner already described are now drawn upwardly by their springs 60 until their studs 61 are out of control of the cams 62 on the carrying racks 36, the racks then being free to move under the impulse of their carrying springs presently to be described, and to impart a proper carrying movement to the higher order carrying pinion or pinions. If, as a result of such carrying movements, the hook 49 of another lever 46 is caused to be disengaged from the bar 52, its lever 43 will be drawn upwardly at once the entire distance without any intermediate period of arrested movement, by the shaft 63, which as already explained, is now raised to an inoperative position. Carrying into the proper higher order pinion will therefore immediately take place.

An oscillating bail formed by the vertical side plates 65 and 66 and tie-shaft 67 is pivotally supported at 68 and 69 and carries between the free ends of the plates 65 and 66 a spring support 70 (Figs. 1, 3, 20 and 22). A series of springs 71 are mounted on the spring support 70 and connected at their other ends to studs 72 projecting from the right sides of the rear ends of the carrying racks 36. In adding position (Fig. 20) the spring support 70 is at the rear so that the springs 71 tend to draw the carrying racks rearwardly, this being prevented as already explained by engagement of the cams 62 on the racks with the studs 61. Provision has been made for shifting the spring support 70 so that the carrying springs 71 will tend to draw the carrying racks forwardly as required in subtraction and as shown in Fig. 22, and this will presently be described.

*Adjusting for subtraction*

To change the adjustment of the machine from addition to subtraction the blades 27 and 28 must be rotated approximately 90 degrees; the plate 40 with the bars 51 and 52 must be shifted forwardly a slight distance; and the spring supports 59 and 70 must be oscillated forwardly from the positions in which they are shown in Fig. 20 to the position in which said supports 59 and 70 are shown in Fig. 22.

A subtraction lever 73 (Figs. 1 and 4) is located at the right-hand side of the keyboard, its lower end being pivoted at 73a near the bottom of the machine on the outer side of the plate 5. A link 74 connects the free or upper end of the lever 73 with the tie-shaft 57 of the oscillating bail in which the spring support 59 is mounted. In the rearward position of the lever 73 the adjustment is that for addition. Manual movement of the lever 73 forwardly for a short distance oscillates the bail and carries the spring support 59 into its forward adjustment (Fig. 22) which is the adjustment for subtraction.

Figure 1:
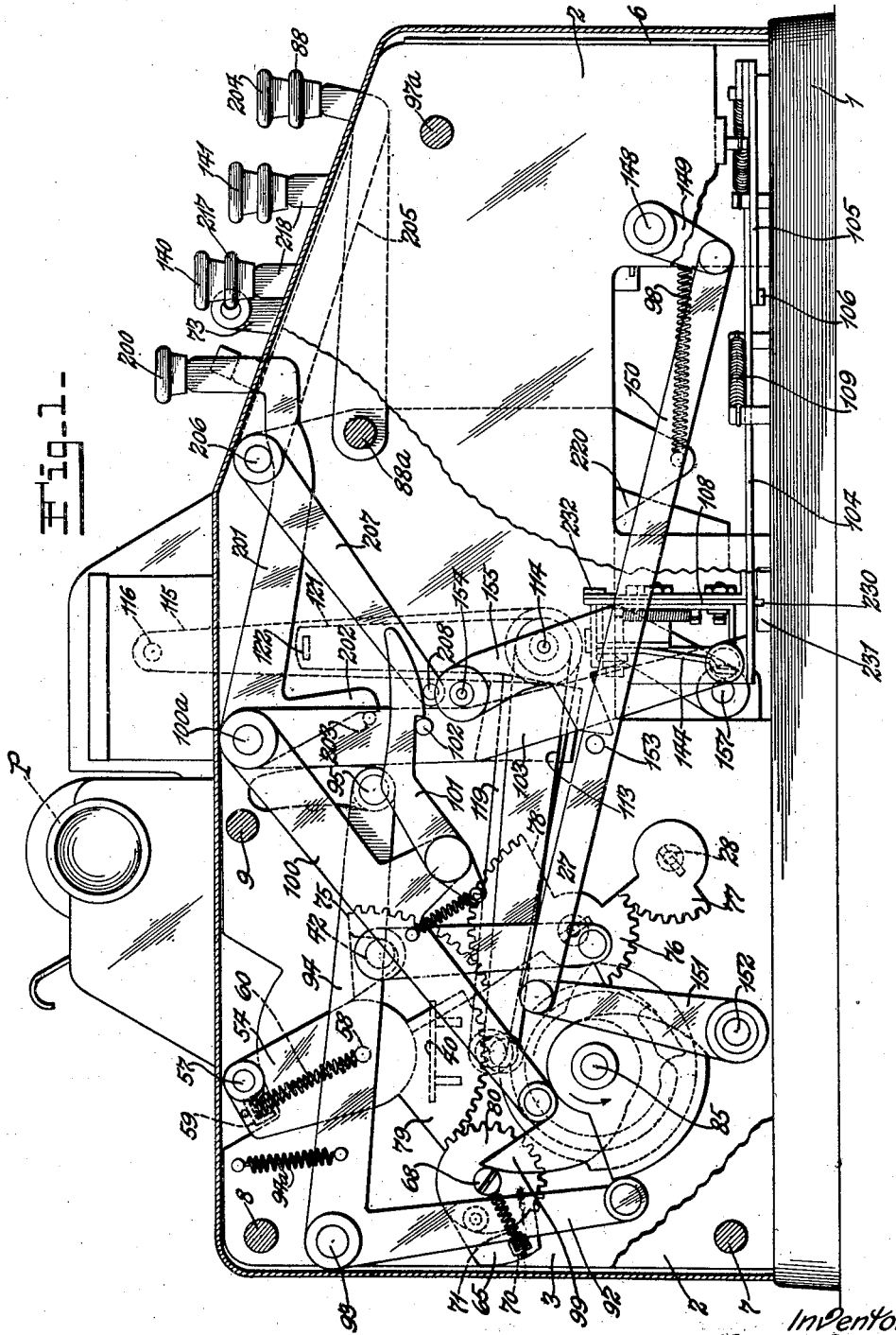
Fig. 1 is a left-hand elevation view, the case being shown in section and portions of the left-hand side plate being removed.

A gear segment 75 (Fig. 1) is formed from the lower part of the plate 54 which, as shown, is the left-hand plate of the bail in which the spring support 59 is mounted. Secured to hubs on the left-hand ends of the blades 27 and 28 are suitable gear segments 76 and 77, being formed of equal diameter and meshing with each other. Another gear segment 78 is formed on the upper part of segment 76, and this in turn meshes with segment 75 on the plate 54. Another gear segment 79 is also attached to the left-hand surface of the plate 54, and this engages with a gear segment 80 formed on the plate 65, which is the left-hand plate of the bail in which the spring support 70 is mounted. The positions of the various parts just described and as shown in Fig. 1 are those for addition. Movement of the subtraction lever 73 forwardly, as has already been explained, moves the spring support 59. Through the trains of gearing just described this will also result in turning each of the blades 27 and 28 approximately one-fourth of a revolution as required, and will turn the spring support 70 into its forward position. The outlines of the gearing just described may also be seen in broken lines in Fig. 20.

A disc 81 (Figs. 3, 4 and 7) is secured on the right-hand surface of the plate 66, which is the right-hand plate of the bail carrying the spring support 70. A stud 82 is carried by the disc 81, being located slightly eccentrically and in the adding adjustment to the rearward of the pivotal point 69 of the bail. A downwardly turned ear 83 formed on the plate 40 has an upwardly extending vertical slot 84 in its lower extremity, into which slot the stud 82 enters. The rotation of the bail to move the spring support 70 into its forward or subtracting position will likewise, through the eccentrically mounted stud 82, move and securely hold the plate 40 and the bars 51 and 52 thereon in their forward or subtracting positions in which the bar 51 will be adjacent to and will cooperate with the levers 44 and 46, the levers now, through the changed adjustment of their springs 60, being yieldingly pressed against the bar 51.

*The cams and the mechanisms operated thereby*

My invention might obviously be carried out in a machine whose movements are derived from the known rocking main shaft. In the present embodiment, however, I have employed a revolving shaft 85 on which are mounted a series of cams whereby the necessary movements of the mechanisms are secured. The cam shaft may be driven by a continuously running motor attached to an armature shaft 86, or in any other suitable manner desired. I have shown (Figs. 2, 3 and 7) a gear and clutch chamber 87 in which may be contained clutch mechanism of known construction suitable for imparting complete revolutions to the shaft 85 upon each depression of a conveniently mounted clutch bar 88, which is arranged when depressed to rock a shaft 88a to which is secured at the right end a depending arm 89, which may be suitably connected to the clutch by a rearwardly extending link 90.

The cams referred to are eight in number and are divided into two classes. Five of the cams mounted on the left portion of the cam shaft 85 always operate regardless of the adjustment of the machine. The three remaining cams are carried near the right end of the shaft 85 and their use is selective, not more than one and at times none of them being in operation at a given time.

I now proceed to describe the various cams and the connections operated thereby in the order in which the cams are placed on the shaft, beginning from the left. See Figs. 3 and 7 to 15, inclusive. All of the cams operate levers, by means of suitable anti-friction rollers.

The cam 91 through an arm 92 rigid on shaft 93 actuates forwardly extending arms 94 (Figs. 1 and 7), between the free ends of which is carried a shaft 95 (Fig. 2) engaging against the upper sides of shoulders 96 on the sliding type plates 10 (Fig. 5). The bail just described is pressed upwardly by a suitably located spring 94a (Fig. 1), and serves the office of restoring the sliding type plates 10 to their lower positions, which is their idle or starting positions, and holding them until the suitable time and then releasing them. It might here be explained that the sliding plates 10 are yieldingly actuated upwardly by springs 98 attached to the depending arms of bell crank levers 97 mounted on the shaft 97a and whose rearwardly extending arms carry studs to engage with suitable slots in the plates 10.

The cam 99, through an arm 100 mounted on pivot 100a, the spring controlled pawl 101 pivoted on said arm 100, the stud 102 on the lever 103 swinging from the pivot 100a, the link 104 having its rear end pivoted to the lower end of said lever 103, the bell crank lever 105 (Figs. 3 and 4), the stud 106 and the lever 107 from which said stud 106 projects, moves the stop carriage which is assembled on the plate 108 to its right hand or idle position against the force of the spring 109.

The cam 110, through an arm 111 rigid on the shaft 42, serves to raise and lower the shaft 63 at the times and for the purposes already explained; that is to say, for the purpose of releasing the arms 43 so that said arms 43 may be raised by their springs 60 to permit movement of the transfer racks 36, as well as for the purpose of relatching the arms 43.

The cam 112, through an arm 113 on the shaft 114 with bearings in the vertical plates 3 and 4, the upwardly extended arms 115 (Figs. 5 and 6), and the shaft 116, restores the printing hammers 117 to latched positions and then retracts the shaft 116 out of the path of the hammers.

The cam 118, through an arm 119 (Fig. 1), the sleeve shaft 120 mounted on the shaft 114, the upturned arms 121 and the cross-bar 122, cooperates with and at the proper times moves the hammer latches 123a in a direction and to an extent to release the hammers and permit them to drive the type on the plates 10 to print. This particular operation of hammer latches is known, but the device for operating the arm 119 and thereby the arms 121 and the bar 122 is new.

The selectively operated cams 123, 124 and 125 are mounted in a sliding hub or collar member 126 which is splined to the cam shaft 85 and is selectively controlled to bring either one of the cams 123, 124 or 125 into operative relation with the roller 127 secured to the computing pinions cradle 32, or to move all of the cams mentioned to ineffective positions, in a manner now to be described.

The cams 123, 124 and 125 are so formed that in the normal or idle position of the machine their edges do not extend high enough to engage with the roller 127, a small clearance being provided. This permits the hub 126 and its three cams to be moved back and forth along the shaft 85 without touching or interfering with the roller 127.

A rock shaft 128 (Figs. 2 and 4) extending from front to rear of the machine has bearings in the cross-plate 6 and a cross-plate 129 and has attached to its rear end a downwardly extending arm 130, on the free end of which a rearwardly extending stud 131 is mounted. The cams 123 and 124 are spaced twice as far apart as are the cams 124 and 125, the extra space thus provided being occupied by a groove or channel 132 formed circumferentially in the hub 126. Into this groove the stud 131 enters, and by the connection thus established the hub 126 is caused to slide along the shaft 85 as the rock shaft 128 is oscillated.

As shown in Fig. 7, the cam 123 stands normally in registry with the roller 127, the rock shaft 128 being in its idle or unoperated position, being drawn thereto in a counter-clockwise direction as viewed from the rear by means of a spring 133 (Figs. 2 and 4) connecting the plate 5 with a stud 134 on an abutment arm 135 which is rigidly mounted on the shaft 128 and later to be further described. In the idle position of the rock shaft 128 under consideration the cam 123 is in registry with the roller 127, but as already explained, is not in actual contact therewith in the unoperated condition of the machine. Immediately when the cam shaft 85 starts to revolve, however, the cam 123 forces the computing pinions upwardly and into mesh with the carrying racks 36 against the tension of a suitable spring attached to the cradle 32 but not shown. The pinions are held in engagement with said racks 36 until the type slides 10 and the rack-discs 16 have been brought to a stop by engagement of the said slides 10 with operated stops or with some part of the stop-carriage. The cam 123 is so shaped that when the slides 10 complete their full movement from starting positions, the said cam permits the computing pinions to return into mesh with the rack teeth 29 on the rack-discs 16, whereupon the type plates 10 are moved to their starting or idle positions and as an incident of which movement the rack-discs 16 are rotated. This is the accumulating movement, and in the adding adjustment shown in Fig. 20 turns the computing pinions in a clockwise direction. Immediately after the type plates 10 and the rack-discs 16 have completed this movement, the cam 123 again forces the computing pinions upwardly into engagement with the carrying racks 36, whereupon the cam 110 releases the shaft 63 which rises under actuation of a spring (not shown). This, as already explained, permits to rise the levers 43 whose hook-levers 46 have been unlatched for carrying, removing their studs 61 from engagement with the cams 62 of the corresponding carrying racks 36 as required for carrying. The cam 123 now permits return of the computing pinions to engagement with the teeth 29 and—completing the cycle of operations—the cam 110 forces the shaft 63 downwardly against the levers 43, which results in restoring the carrying racks which had been released to their former positions and carrying all of the hooks 49 or 49a below the bars 51 and 52 for relatching therewith. The operations just explained occur whether the machine be in the adding or the subtracting adjustment, being the same for both except for the direction of rotation of some of the parts.

Toward its forward end (Fig. 2) the shaft 128 has three arms 136, 137 and 138 rigidly mounted thereon, their right-hand or free ends passing through vertical slots in the side plate 5. The ends of the arms, respectively, also pass through similar slots in three vertical key-stems, namely, the sub-total key 139, the total key 140 and the non-add key 141 (Fig. 4). These slots in the key-stems are so arranged that depression of the several keys rotates the shaft 128 unequal distances, the non-add key 141 imparting the greatest extent of rotation, the total key 140 next distance of rotation and the sub-total key the least rotary movement. Rotation by the non-add key 141 moves the extreme right-hand cam 125 into operative position, rotation by the total key 140 moves the control cam 124 into operative position, and rotation of said shaft 128 by the sub-total key 139 moves the hub member far enough only to bring the channel or groove 132 into position below the roller 127; that is to say, the sub-total key 139 moves all of the cams 123, 124 and 125 into ineffective positions.

A latch-plate 142 yieldingly held in one position by a spring 143 is suitably mounted just to the left of the key-stems 139, 140 and 141, and when one of these keys is depressed said plate latches and retains said key stem in such depressed position until released in one of the ways to be described. In the taking of a sub-total no disengagement of the computing pinions from the rack teeth 29 is necessary, and no sub-total cam is provided. In the taking of a grand total, in order to leave the computing pinions at zero, the latter must be moved out of engagement with the rack-teeth 29 just previous to the return movement of the latter. The cam 124 is shaped and arranged to do this and to provide for re-engagement at the every last of the movement of the cam shaft after return movement of the rack-discs is complete. In "non-adding" it is necessary to keep the computing pinions out of engagement with the rack-discs during both the forward and the return movements thereof, permitting them to return to engagement therewith after such movements are complete. The cam 125 is shaped and arranged to do this.

In the taking of a total or sub-total it is further necessary to free the type plates 10 from the normal block of the resilient universal zero stop or abutment plate 144 (Figs. 1, 6, 16 and 18) of the stop carriage. Each of the key-stems 139 and 140 is provided with an ear or shoulder 145 (Fig. 4) which ears or shoulders overlie a stud 146 extending to the right from the rear or free end of an arm 147 rigid on the right-hand end of a rock shaft 148 extending transversely of the machine and having bearings in the side plates 2 and 5. Upon its opposite end and to the left of the side plate 2, the rock shaft 148 carries a depending arm 149 from the lower end of which a link 150 extends rearwardly and is attached to the upper end of an arm 151, whose lower end is rigidly secured to the left-hand end of a rock shaft 152, the functions of which are presently to be described. Intermediate its ends the link 150 carries an inwardly extending stud 153. A short shaft 154 is supported in bearings in the plates 2 and 3. At each end of this shaft are rigidly attached depending arms 155 and 156 which carry at their lower ends another shaft 157 the right end of which carries an enlargement 158 (Fig. 3) located immediately to the rear of the bottom edge of the stop or abutment 144 of the stop carriage. It is now clear from the description of these parts that when either the total or the sub-total key is depressed the link 150 will move the stud 153 forwardly. This stud being just to the rear of the arm 155, the latter, and with it the shaft 157, will also move forwardly, and through the enlargement 158 the lower edge of the stop or abutment 144 will be moved toward the front to an extent and to a position in which the lower edge of the abutment stop 144 is clear of the heels or shoulders 144a on the lower ends of the slide plates 10. This permits said plates 10 to rise without interference from the part 144, as required in the total taking operation in which limiting of the movement of the slide plates 10 and their associated parts is the function of the blades 48 and the lugs 35.

The total key lock

To avoid misleading and confusing results, when a negative total is registered in the machine a total must not be taken while the machine is adjusted for addition, nor must a total be taken in the negative adjustment when a positive total is in the machine. To prevent this being done through inadvertence, a device is provided which prevents depression of the total or sub-total keys unless the machine be in the proper adjustment for the character of the total it then contains.

On the right-hand end of the rock shaft 152 an upwardly extending plate or arm 159 is rigidly secured (Figs. 20, 21 and 22). On two studs 160 extending from the right side near the bottom edge of the arm 159 another plate 161 is mounted in such a way as to permit it to rock slightly in a right and left direction. A small disc 162 carrying a nose 163 is mounted on a stud 164 at the left side and at the upper end of the plate 161 so that it may turn freely on the stud 164. A stud 165 projecting from the right lower portion of the disc 162 is connected by a spring 166 to a stud 167 in the plate 161. The spring 166 thus serves to hold the disc 162 yieldingly in position so that the stud 165 will be in contact with the forward edge of the plate 161. The stud 164 has an elongated head terminating in the form of a blunt cone (Fig. 21), the point of which is yieldingly held against the right side of plate 3 by means of a spring 168 connected to an ear 169 turned from the bottom edge of the plate 161 and extending toward the right, the upper end of the spring 168 being attached to a stud 170 extending to the right from the plate 159 through a suitable opening in the plate 161. In the adjustment of the machine for addition the plate 161 with the disc 162 is in position with the point of the stud 164 in contact with the plate 3.

To the left of the computing pinion 30 that is in highest denominational order is a special pinion 171 (Figs. 3 and 7), attached to which on its left side are two discs 172 and 173 having points or abutments 172a and 173a which extend rearwardly, the abutment 172a being lower and farther to the left than the abutment 173a. The disc 172 of which abutment 172a is a part also carries two forwardly extending fingers 174 and 175 which embrace the tie-shaft 34 of the computing pinion cradle, with just sufficient space between them to permit the special pinion to have an extent of movement exactly equal to one unit space, or in the present embodiment, eighteen degrees. A carrying rack similar to the other carrying racks 36 is provided for the special pinion 171. The abutment lugs 35, while they will do no harm, will serve no useful purpose and may be omitted from the pinion 171. No depending lever 44 with its blade 48, nor any lever 46 nor rock-disc 16 is provided for the pinion 71.

When a positive total is contained in the computing pinions the lower finger 175 will be in contact with the shaft 34, as seen in Fig. 20. With the stud 164 in direct contact with the plate 3, the point of the nose 163 will be in the same vertical plane with the abutment 172a, but to the rear of said abutment. And the abutment 172a will be below the nose 163. If, now, the total or sub-total key be depressed and the link 150 drawn toward the front of the machine, the shaft 152 will rock, carrying forward the plate 159 with its entire assembly, including the nose 163, the latter in the adjustment described passing above the abutment 172a and to the left of the abutment 173a. If, however, the machine had contained a negative total the upper finger 174 would have been in contact with the shaft 34, and the abutment 172a would have been elevated into the path of the nose 163, and depression of the total or sub-total keys would be blocked because the rock shaft 152 would be blocked from turning toward the front (Fig. 22).

When the operator finds he cannot depress the total or sub-total keys, as just explained, he should simply change the position of the subtraction lever 73, in the present instance moving it from the rearward to the forward or subtracting position. In thus changing the adjustment from adding to subtracting, the spring support 70 moves from its rearward position (Fig. 20) to its forward position (Fig. 22), and as an incident to such movement changes the position of the plate 161 and the nose 163, moving them a slight distance to the right, or away from plate 3, thereby moving the nose 163 out of vertical plane of the abutment 172a and carrying it into the vertical plane of the abutment 173. The latter, however, will not interfere with forward movement of the nose 163, for due to the change to subtracting position, it now stands above the nose 163, which may pass freely below it.

The lateral movement of the plate 161 just mentioned is caused by the spring support 70 in the following manner. A bell crank lever 176 is pivoted at 177 at the right hand side of plate 3 and is drawn in a clockwise direction as seen in Figs. 20 and 21 by a spring 178 secured to its short arm and to a stud on plate 3. The point of the stud 164 extends through an arcuate slot in the lever 176, the upper edge of the slotted portion being formed with a cam or bevel 179 (Fig. 21). The lever 176 is provided with a cam 180 at its upper extremity which normally extends into the path of movement of the spring support 70. Near the end of its forward movement in passing into the subtracting position the spring support 70 engages with the cam 180 and forces the lever 176 downwardly against the tension of the spring 178. The blade portion 179 on the lever 176 is now forced between the stud 164 and plate 3, moving the former, together with the plate 161 and nose 163, a slight distance to the right, sufficient to bring the nose 163 into the vertical plane of the abutment 173a, but to the rear of said abutment 173a, as already explained.

In the process of taking a sub-total, as already explained, the computing pinions 30 remain in engagement with the rack teeth 29 during forward and return turning movements of said racks 29. In taking a grand total, however, the pinions 30 move out of engagement with the racks 29 and into engagement with the carrying racks 38 before the beginning of the return movement of the rack-discs 16. If, therefore, the nose 163 had been formed integral with the plate 161, the abutment 172a (over which the nose 163 passes in taking a positive total) would be moved against the nose 163 and interference would result. It is, therefore, necessary to mount the nose 163 so that it may yield and be temporarily deflected upwardly under the condition stated, which is accomplished by placing it on the disc 162 and providing the spring 166 to hold it in normal position at other times.

*The fugitive one*

Figure 3:
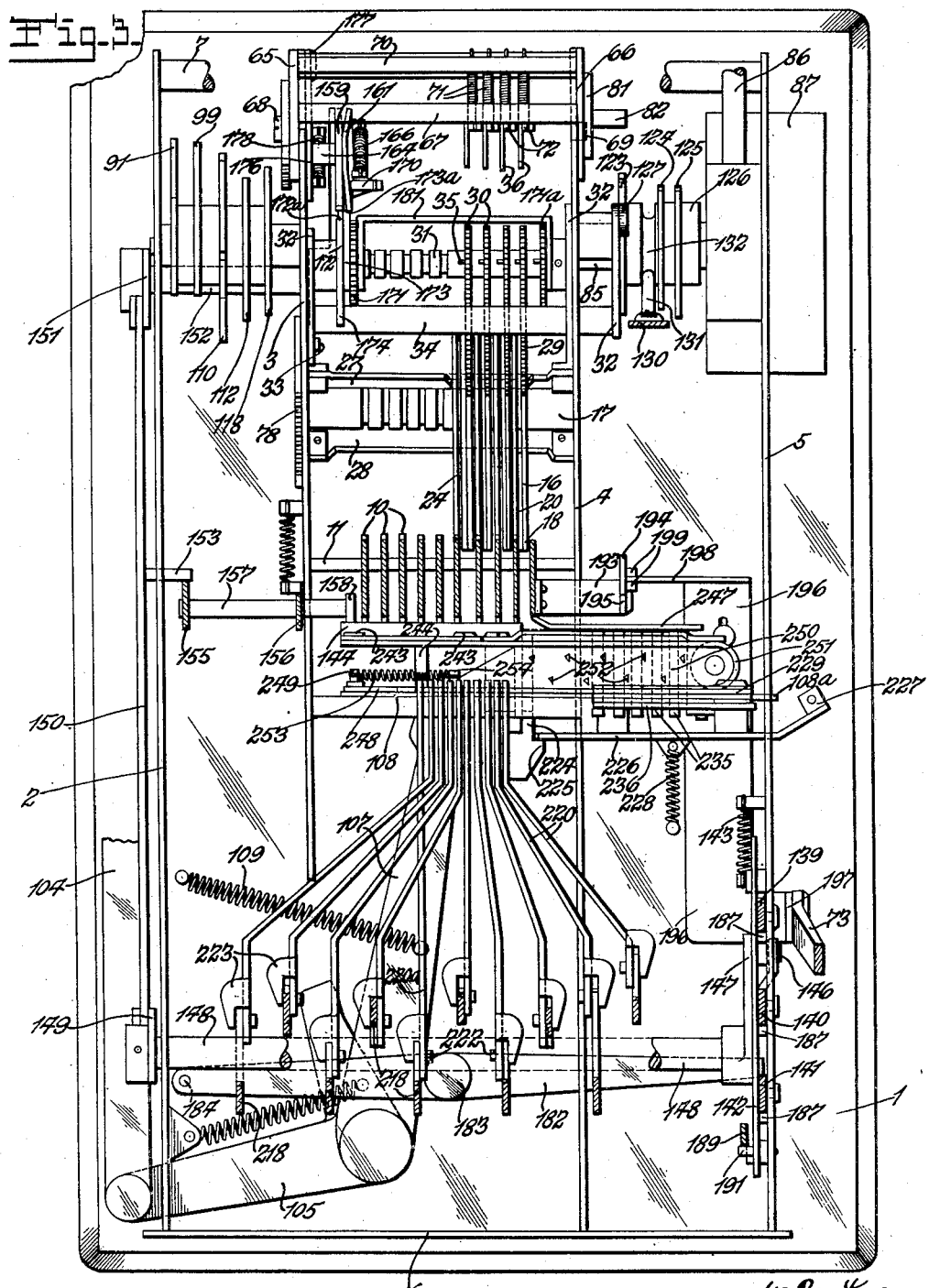
Fig. 3 is another plan view with additional mechanisms removed more clearly to show the stop-carriage, escapement plate, the tappet or stop-setting levers, the computing pinions with their actuating racks, the cam shaft, gear and clutch chamber, etc.

In algebraic totalizer machines it is necessary under certain conditions to add or subtract one unit. In the present embodiment this is accomplished in the following manner. To the right hand side of the special pinion 171 already described I attach one end of a bail or U-shaped bar 181 extending toward the right in a direction at right angles to the pinion 171, said bail or bar passing to the rear of the whole assembly of computing pinions and bending toward the front at its right end to connect with a disc or pinion 171a like the computing pinions 30 (Fig. 3). The pinion last mentioned is not provided with either a rack-disc 16 or a carrying rack 36 and has no need for the rack teeth on the other pinions 30, although the teeth would not do harm. This disc or pinion 171a however is equipped with the two carrying and abutment lugs 35, which cooperate with depending levers 44 and 46 exactly as do the lugs 35 in units and higher orders.

The special pinion 171, which has already been described in connection with its function in locking the total and sub-total keys, has but two positions, a positive position and a negative position. It never passes from one of its positions to the other except as a result of subtracting from a positive total in the machine an amount larger than the positive total; or adding to a negative total in the machine an amount that is larger than the negative total. Whenever this occurs it becomes necessary, in order that the computing pinions may correctly register the true total, to impart one unit of movement to the computing pinion of units order in addition to its proper movement in registering the amount being added or subtracted. This is accomplished by the special pinion in connection with the web 181 and the pinion with the carrying lugs 35 mounted on the right end of the web 181, each movement of the special pinion 171 through the connections described producing a regular transfer of the fugitive one into the computing pinion of units order.

*Unlatching the total keys*

The total key 140, the sub-total key 139 and the non-add key 141 when depressed are each latched in depressed position by the latch 142, as already described. There are two ways of releasing this latch and allowing the depressed key to be restored to raised or normal position by its spring.

A transverse lever 182 (Fig. 3) is mounted near its middle on a stud 183 in the base of the machine near the front. A stud 184 is mounted on the under side at the left end of lever 182 and extends into the path of the leftwardly extending arm of the bell crank lever 105 whose function it is to move the stop carriage to starting position. When the lever 105 nears the end of its movement its rearward edge engages with the stud 184, carrying the left end of the lever 182 rearwardly during the remainder of its movement. This actuates the right end of the lever 182 forwardly against a shoulder or arm 185 (Fig. 4) on the latch plate 142 and moves it forwardly against the force of its spring 143 to an extent sufficient to carry its key latching studs 186 away from the engaging hooks 187 on the key levers 139, 140 or 141, thereby releasing them from the latch. The unlatching just described would also follow depression of the error key 200 (Figs. 1 and 2), which operates the lever 105 to return the stop carriage in the same manner that said lever 105 operates in connection with a regular computing operation.

Manually operated means are provided for releasing the keys 139, 140 and 141 in event of inadvertent depression of said keys. A key 188 is carried at the rear end of a bell crank lever 189 mounted on a stud 190 on the inner side of the plate 5, its depending arm being in engagement with a stud 191 on the latch plate 142. Depression of the key 188 will force the arm of the bell crank lever against the stud and move the latch plate 142 out of locking engagement with the depressed key.

*Controlling the special type plate 10*

The type plate 10 at the extreme right does not engage with any gear segment 14 or rack segment 26, nor is it provided with a heel, or shoulder at its lower end for engagement with the stops in the stop-carriage. It is equipped with a complement of type blocks having special or arbitrary characters engraved thereon for the purpose of marking or designating the various records produced by the regular printing type of the machine. A special character is provided for instance to indicate a positive total, another character to indicate a positive sub-total, and another character to indicate that an amount has not been included in the total. Other characters indicate a negative total, a negative sub-total, an item that has been subtracted, etc. This special type plate is controlled for the selective positioning of these type by the rock shaft 128 in the following manner.

A bracket formed by a small rod 192 and a bent plate 193 (Figs. 2, 3, 7, and 16) extends to the right from the lower end of the special type plate 10 and carries pivotally mounted at its right an upwardly extending arm 194 having a shouldered portion 195 on its forward edge (Fig. 4). A plate 196 is guided for sliding movements on the base of the machine, having a short forward and backward movement, which is imparted through an ear 197 upturned from the right edge of the plate at its forward end. The ear 197 is pivoted to the lower end of the subtraction lever 73. The rear end 198 of the plate 196 is bent into a vertical position, its left edge passing between two studs 199 projecting to the right from the upper portion of the arm 194. When the upper end of the subtraction lever 73 is moved to its rearward position (which is the adjustment for addition) the plate 196 is drawn forward, and through its vertical portion 198 turns the arm 194 forwardly also, so that its upper end is in registry with the stepped abutment plate 135 carried on the rock shaft 128. The construction of the parts is such that so long as the rock shaft 128 remains in its normal or "computing" position no movement of the special type plate will occur and as the type hammer mechanism for the special plate 10 is independent of or "split" from the other type hammers no special character will be printed when items are listed for ordinary addition.

When the sub-total key is depressed the shaft 128 is rocked a short distance sufficient to move the second step or abutment from the end of the abutment plate 135 into alinement with the arm 194. This permits the special type plate to have one space of movement, which places the character for "sub-total" at the printing position, and printing now takes place on the printing of a sub-total.

When the total key 140 is depressed the rock shaft 128 is given an additional extent of rotation, which brings the third step or abutment on the abutment plate 135 into alinement with the abutment arm 194, and the special type plate moves two spaces, bringing the character for "total" into printing position. Similarly, when the non-add key 141 is depressed, additional rotation is given the shaft 128, bringing the fourth step or abutment on the plate 135 into cooperative relation with the arm 194 on the special type plate, thus allowing it to move upward three spaces and to position for printing the special character for indicating that the item printed was not included in the total.

Now, if the adjustment of the machine be changed from addition to subtraction by moving the subtraction lever 73 to its forward position, the plate 196 with its upturned portion 198 will be moved rearwardly a distance sufficient to bring the shouldered portion 195 of the abutment arm 194 into alinement with the stepped abutment plate 135. Due to the location of the shoulder 195, in the normal or "accumulating" position of the rock shaft 128, the special type plate may move four spaces, bringing to the printing line a special character indicating a subtracted item; and similarly, when the sub-total key is depressed, it will move five spaces, bringing to printing position a special type to indicate a negative sub-total. In similar manner, the special type plate positions a character type to indicate a negative grand total and also that an item was printed but not subtracted from the total.

*Error, repeat and non-print keys*

When the wrong digit key has been operated the error is corrected by operation of an error key 200 carried on the forward arm 201 of a bell crank lever mounted adjacent to the lever 103. The depending arm 202 of this bell crank lever engages with the forward edge of a stud 203 on the lever 103 and when the error key 200 is depressed the lever 103 is moved towards the rear and the stop carriage moved to its starting position through the connections 104, 105, 106, etc., already described.

When it is desired to accumulate an item more than once, resetting may be avoided by operation of the repeat key 204 which is mounted at the forward end of an arm 205 rigidly secured to the right-hand end of a transverse rock shaft 206 (Fig. 2). A rearwardly extending arm 207 (Fig. 1) is secured to the other end of the shaft 206, from the free end of which a stud 208 extends to the left and immediately below the lever or pawl 101 carried by the arm 100. Depression of the repeat key 204 will rock the shaft 206, elevate the rear end of arm 207 and lift the pawl 101 above the stud 102 on the arm 103, thereby disabling the connections 103, 104, 105, 106, etc., already described, whereby the stop carriage is moved to starting position and resulting in repetition of the last item set up in the machine; and the same item will continue to be printed and added so long as the repeat key is held depressed.

Provision may be made for accumulating an amount without printing it. A blade 209 (Fig. 5), for instance, may be suitably mounted to intercept percussive movement of the printing hammers 117. The blade may be operated in any convenient manner, as by a key 210 (Fig. 5) mounted near the rear end of a lever 211, pivoted at 212, with returning spring 213 and a lip 214 for engaging a stud 215 attached to the blade member, which is moved to ineffective position by a spring 216.

*The digit setting-up mechanisms*

A series of digit keys 217 on the upper ends of suitable key-stems 218 are arranged in a keyboard, the lower ends of the key stems being guided in cross-plates 219. A series of horizontally disposed tappet levers 220 (Fig. 5) are pivoted at their rear ends on a plurality of supports 221, the forward ends of the levers being connected as by pin-in-notch arrangement 222 to the key stems 218. In order more accurately to guide the movements of the tappets, ears 223 (Fig. 3) may be formed at the upper and lower edges of the forward ends of the levers for engagement with the key stems. The zero tappet lever, which is marked 220a and which extends directly forward, is located below the others, most of which require to be deflected to the right or left to connect with their key-stems 218, the arrangement mentioned avoiding interferences where the levers last mentioned cross the zero lever 220a. Depending portions of the tappet levers 220 carry tappets 224 (Fig. 5) arranged in a vertical line and in the order 0 to 8, inclusive, from the bottom up. The levers also carry shoulders 225 (Figs. 3 and 17) for engagement with the vertically positioned escapement plate 226. The 9-tappet lever has no tappet 224 but has a shoulder 225 only, there being no movable 9-digit stops. The escapement plate 226 is pivotally mounted on a vertical bar or stem 227, is normally held toward the front by a spring 228 and carries an escapement 229 mounted on the rear side near its upper edge. This escapement may be of any suitable construction, so that oscillation of the plate 226 by the levers 220 and the spring 228 will step the stop carriage to successive denominational orders. The escapement co-operates with a rack 108a.

In ten-key machines employing a stop-carriage it is important that the stop-carriage be of rigid, but at the same time of very light construction, and also that no unnecessary resistance to its free and easy movements be permitted. Not only must the stop-carriage move quickly when released by the escapement in setting up numbers, but it must be returned to its starting position very quickly, and material resistance due to excessive weight, undue friction or other causes would seriously load up the operation and render a smoothly operating machine impossible. To these ends, I have constructed the stop-carriage employed in the machine of the invention in the following manner.

The plate 108 heretofore mentioned of substantially quadrangular shape is vertically mounted for transverse movements in a groove 230 formed in a plate 231 secured to the base of the machine, the upper portion of the plate 108 passing between and being laterally guided by transverse plates 232 and 233 (Figs. 6, 18 and 19), a downwardly turned lip 234 formed on the rear edge of the latter serving also as the permanent universal 9-stop for the type plates 10, and its under surface also serving as a "roof" or upward limit or abutment for the upper edge of the rear of the stop-carriage as well as for the top edge of the movable zero stop or abutment stop 144. That is to say, the transverse plate 233 determines the vertical position of all of the digit stops, as the base or "datum". The plate 233 may be secured between the plates 3 and 4 by means of another plate 234a joined to its upper surface. In the upper right-hand portion of the plate 109 the series of rack teeth 108a are integrally formed. The plate 108 being of small size and containing no offsets, may readily be case hardened, if necessary.

A rectangular opening is formed in the plate 108 through which the series of digit stops 235 pass. These stops are mounted in a forward plate 236 and a rearward plate 237, mounted on the plate 108 by means of three bolts 238 passing through collars 239 and having head portions 240 on their rear ends and nuts 241 on their forward ends. The front plate 236, which rests directly against the front side of plate 108, is flat but the rear plate 237 is slightly offset near each end to prevent the heads of the nuts extending beyond the rear face of the central portion of plate 237 and interfering with the type plates. The left portion of plate 237 is extended to form an arm 242 which by means of two studs 243 loosely supports the vertical plate 144 (Fig. 3) heretofore mentioned. A stud 244 extends forwardly from the upper portion of the plate 144, the outer end of which is connected by a spring 245 to a stud 246 in the plate 108, the lower edge of the plate 144 being thereby yieldingly held toward the rear and in contact with a suitable limit (not shown). The lower edge of the plate 144 is on the same horizontal line as the lower edges of the series of zero stops, and serves as a universal zero abutment to retain in unmoved position those type plates 10 for which digit stops are not set.

In totalizing operations it is necessary to remove the block of the plate 144, and the means whereby this is effected have already been described. A cam plate 247 (Figs. 3 and 5) is suitably mounted slightly to the rear of the plate 237 and to the right of the field in which the stops are set by the tappet levers, for the purpose of returning operated stops to their idle position.

In stop-carriage machines provision must be made to retain stops that have been set in their set positions and also to prevent accidental movement of any of the unoperated stops into position in which they might engage type plates 10. This has usually been accomplished by providing an individual detent spring for each stop, making, in a machine of the capacity of the one illustrated, seventy-two springs. In my present construction I have omitted these seventy-two springs, substituting in their stead a single detent device actuated by a single spring. This I shall now describe.

A plate 248 of light metal is mounted at its left end for very slight lateral movement on studs 249 on the rear side of plate 108. At the top and bottom the edges of the plate 248 are deflected at right angles toward the rear. The vertical portion of the plate 248 terminates to the left of the left-hand bolt 238, but the two deflected portions 250 extend to the right, passing just above and just below the series of digit stops 235, respectively. Slightly to the right and left, respectively, each of the deflected portions 250 carries an anti-friction roller 251 engaging and riding upon the inner surfaces of the plates 108 and 237. Between these two deflected portions 250 are mounted and carried nine detent bars 252 of triangular cross-section and having one of their angles toward the left, the series of detent bars 252 being suitably staggered to cooperate with matching notches formed in the right edges of the digit stops 235, which are also provided with suitable limiting and retaining shoulders. A spring 253 is secured to one of the studs 249, its other end being attached to a stud 254 on the rear side of the plate 248. In this manner the device described, with its single spring 253, serves as an efficient detent for the entire complement of seventy-two digit stops.

To avoid friction and resistance and to save unnecessary wear on the points of the detent bars 252 and the points of the notches in the digit stops 235, I make this further provision. In the lower edge of the plate 108 near its left-hand end I form a slot or opening 255 (Fig. 17). A roller-carrying plate or block 256 is mounted in the opening 255, being retained therein by means of a slot in each of its ends, these slots engaging with the vertical edges of the plate 108 at either side of the opening 255. Provision is made for permitting the block 256 to have a slight longitudinal movement relative to the plate 108 by making the plate 256 between the bottoms of its slots slightly shorter than the distance between the right- and left-hand edges of the slot 255 in the plate 108. The purpose of this relative movement will later appear.

On a stud 257 on the lower edge of the block 256 a roller 258 (Figs. 18 and 19) is mounted, this roller being engaged by the bifurcated ends of the lever 107, thus forming the connection whereby the latter moves the stop-carriage to its starting position in a manner already described.

As will be observed from the drawings, the rear side of the block 256 extends rearwardly beyond the rear edge of the plate 248, a shoulder on the latter extending downwardly and engaging with the right-hand end of the block 256. The relation of the parts is such that when the block 256 is in engagement with the left-hand edge of the opening 255 in the plate 108 and the detent bars 252 are seated in the bottoms of the notches in the digit stops 235, the right-hand end of the block 256 and the shoulder on the plate 248 will be in engagement except for a slight clearance. This is the condition which exists when the stop-carriage is in engagement with and being held by the escapement against the tension of the spring 109, the detent device under these conditions being free to slide back and forth as required by the movement of the digit stops 235 to set positions. When, however, the lever 107 is moved toward the right to restore the stop-carriage to idle position the block 256 will be pressed against the shoulder on the plate 248, will overcome the force of the spring 253 and will move the plate 248 a short distance to the right until the block 256 is stopped by engaging with the right-hand edge of the slot 255 in the plate 108. The plate 248 thus carries the detent bars 252 to the right a distance sufficient to place them temporarily out of engagement wtih the stops 235 while the latter are moved to idle positions by the cam 247, no resistance to such movement whatever being occasioned by the detent device.

In the operation of the digit stop detent device just described there is nothing but friction and inertia to prevent movement of other stops from idle to set positions, or vice versa, while a stop is being set by a digit key. To guard against such an accidental displacement, I provide frictional detent devices or combs 259 (Figs. 26 and 27). These combs are stamped out of thin resilient metal and are slightly curved along their longitudinal axes. A pair of the combs is inserted adjacent to each alternate transverse row or series of digit stops 235, as shown in Fig. 27. Projections 260 are provided on the outside forward teeth of each comb 260 for the purpose of engaging with the vertical edges of the rectangular opening in plate 108 and thereby holding the combs 259 in proper adjustment so that two teeth of each comb will press against each of the digit stops 235 and hold them frictionally against accidental displacement. In this adjustment the detents 252 will pass between the teeth of the combs 259.

Setting up items

To introduce or set up an item or amount the operator selects and depresses the appropriate digit keys 217, operating the keys in the order in which the digits occur in the number proceeding from left to right. To set up the number "175", for instance, the "1" key is first operated, then the "7" key and finally the "5" key. As a result, the number "175" would then be represented in the traveling differential stop carriage by rearwardly set or positioned stops 235, namely, the "1" stop in hundreds, the "7" stop in tens and the "5" stop in units order, respectively. The universal zero stop plate 144 will also be moved toward the left and out of the paths of the heels 144a of the three type plates 10 which are needed in running the number "175" into or through the machine.

Addition

Assuming, now, that the item "175" just set up is to be added: The lever 173 is in its rearward or adding position and then the motor clutch bar 88 is depressed. This causes the motor to turn the shaft 85 one complete revolution, during which the following movements and operations take place: The bail 63 rises a slight distance, stopping just after the hooks 49 on the levers 46 engage with the bar 52 but not sufficient to permit the studs 61 to pass above the dwell between the cams 62 should the hooks 49 be displaced and the levers 43 left free to move upwardly; the computing pinions 30 move out of engagement with the racks 29 and the bail 95 is released and moves upwardly out of the paths of the shoulders 96 on the type plates 10. The type plates 10 in units, tens and hundreds orders are then raised by their springs 98 until the heels 144a on said three type plates engage with and are arrested by the rear ends of the set stops 235, which set stops project to the rear and into the paths of said heels 144a; but the type plates 10 in the orders above hundreds do not move because they are still blocked by the universal zero stop plate 144.

In this adding adjustment of the machine the rack segments 26 are in engagement with the racks 13 on the type plates 10, and as the three released type plates rise their respective racks 2a are moved in a clockwise direction. When the type plates 10 have reached the extent of upward movement permitted by the operated stops 235 in their respective denominational orders loosely mounted type T on said plates 10 and representing the number "175" will be positioned at the printing line of the platen P and the appropriate hammers 117 will be released by operation of the bar 122; and the positioned types "1", "7" and "5" will be driven toward the platen and will record the amount "175".

The computing pinions 30 are then moved into engagement with the racks 29, whereupon the bail 95 is moved downwardly, returning the type plates 10 to their original position. During this return movement the racks 29 (Figs. 6 and 20) will move in a counter-clockwise direction and will actuate their respective computing pinions 30 in a clockwise direction to accumulate or add the digit "5" in the units, the digit "7" in the tens and the digit "1" in the hundreds pinion, respectively.

As soon as the type plates 10 and racks 29 have come to rest at their starting positions, the pinions 30 are again moved away from the racks 29 and into engagement with the carrying racks 36, and the bail 63 is elevated to a position out of the paths of the levers 43, so that if any of the levers 43 had been released by the computing pinions for carrying, they would now be permitted to move upwardly to release the carrying racks 36 by withdrawing their studs 61 from the cams 62 of said carrying racks 36. Assuming that the machine was clear at the beginning, however, the addition of the item "175" would result in no carrying of the tens, and even though the bail 63 is now out of the way no lever 43 will move, all the levers 43 being still held in their latched position by engagement of the hooks 49 with the bar 75

52. The bail 63 is now lowered to the fullest extent of its movement, forcing all of the hooks 49 on the levers 46 a slight distance below and out of contact with the bar 52. Also, during or about the time of the return movement of the type plates 10, the hammers 117 which had operated were relatched by operation of the bail 116, which then retired to a position out of the path of the hammers; and the stop carriage, through the connections 100, 103, 104, 105 and 107, was returned to the idle position and the digit stops 235 that were set are restored to their unset condition.

The item "175" having been added is now registered in the computing pinions 30. To this now add, say "25": The item is set up as before, depressing in order the "2" and the "5" digit keys 217, which, as previously explained, results in setting or positioning corresponding digit stops 235 in the traveling differential stop carriage, the "2" stop being in the tens and the "5" stop in the units order. Depressing now the motor clutch bar 88, the cam shaft 85 is again caused to make a complete revolution, like movements of the associated parts taking place as previously described, but only in the two denominational orders—units and tens—all of the type plates 10 and their cooperating trains above the tens order being now held against operation by the universal zero stop plate 144.

When the tens and units type plates 10 have been stopped in the "2" and the "5" positions, respectively, the item "25" printed and the computing pinions 30 reengaged with the racks 29, the operated type plates 10 and immediately following them the stop carriage return to their idle positions as before. As a result of the operation thus far the units computing pinion 30 has been advanced the additional distance of five units and the tens pinion the additional distance of two units. As the units pinion, originally in its "0" position, advanced five units in the previous operation, the additional rotation now brings it again to the "0" position. As it passed from the "9" position to the "0" position one of its lugs 35 was moved against the blade 48 in units order and moved the latter, together with the lever 46 and its hook 49, to the right (Figs. 6 and 20), disengaging the hook 49 from the bar 52. The lever 43 to which the levers 44 and 46 are secured was then raised by its spring 60, but only a very slight distance, for the lever 43 will engage with the bail 63 and the stud 61 will still be held in the central dwell between the cams 62 on the carrying rack 36 of tens order with which the stud 61 is engaged.

The tens accumulating pinion 30 which had already advanced the distance of seven units in the previous operation as a result of the present operation advanced the further distance of two units, placing it in the "9" position where one of its lugs 35 will lie adjacent to the blade 48. After the type plates 10 in units and tens orders reach their idle positions the computing pinions 30 will be moved as before into engagement with the carrying racks 36, whereupon the bail 63 will be elevated to permit movement of all levers 43 which stand released from the bar 52—being in this instance only the lever 43 in units order. The units lever 43 will thereupon be drawn upwardly by its spring 60, and its stud 61 moved entirely out of engagement with the cams 62 of the carrying racks of tens order. Freed from the restraint of the stud 61, the tens carrying rack 36 will be drawn quickly toward the right (Fig. 2) and thereby rotate the tens computing pinion one additional space toward the right. The tens computing pinion already stood at "9" and in moving the additional unit space its lug 35 pushed the blade 48 and moved the hook 49 out of engagement with the bar 52 and the lever 43 in tens order was thereupon drawn upwardly by its spring 60. As the bail 63 is now in its extreme upward position, the lever 43 is not halted but flies upwardly, instantly freeing the carrying rack 36 of hundreds order, which immediately rotates the hundreds computing pinion 30 one unit space to the right. Thereupon the bail 63 moves downwardly to its extreme extent, restoring the operated carrying racks 36 by forcing the studs 61 on levers 43 into the dwells between the cams 62 and forcing all of the hooks 49 to latching position slightly below the lower edge of the bar 52.

As a result of the addition of the two items "175" and "25" a positive total of "200" is now registered in the computing pinions.

*Listing without adding*

By this machine one may print a number without adding the said number into the total. The necessity for this is frequently encountered, and the operation is commonly called "non-adding". It may be performed in either the positive or the negative adjustment of this machine. The operator proceeds by first depressing the non-add key 141. This rotates the total shaft 128 to shift the computing cam 123 out of, and the non-add cam 125 into, position to cooperate with the roller 127, thereby placing the computing pinions cradle 32 under control of the cam 125 to govern its meshing and unmeshing of the computing wheels with the racks 29 and the carrying racks 36. This rotation of the total shaft 128 also moves the abutment plate 135 which is secured on said shaft to position to permit the special character type plate 10 to move upwardly to a sufficient extent to present at the printing line of the platen P a type bearing the non-add sign E.

The number to be printed but not added—say the number "14"—is next introduced by operation of the digit keys 217 just as for addition, and the motor clutch bar 88 is then depressed, causing the cam shaft 85 to make one complete revolution, during which it actuates the mechanisms as follows: The bail 63 rises slightly, the computing pinions 30 move out of engagement with the racks 29 and the bail 95 rises. The units and tens type plates 10 now rise until their heels 144a are arrested by engagement with the operated stops representing the number "14" (a "1" stop in tens and a "4" stop in units denominational order), and the special character type plate also rises until it is arrested by its arm 194 engaging the abutment plate 135 as now positioned by the total shaft 128. As a result of these movements there are now alined at the printing line a "1" type in tens order, a "4" type in units order and just to the right of the latter the non-add character type E. Upon the release of appropriate hammers 117, which now occurs, the number "14", followed by the non-print sign E, will be printed, thus, "14E", the special non-print character E showing that the number has not been included in the total.

The bail 95 now descends, restoring the operated type plates to normal position and relatching the operated printing hammers, and the stop carriage is returned to normal position. After the type plates have come to rest, the computing pinions 30 are reengaged with the racks 29 and the bail 63 rises and then descends (idly in this case, for there is no carrying to be performed or carrying mechanism to be restored). At the last part of the revolution of the cam shaft 85 the non-add key is unlatched and returns with the total shaft to normal position, the latter restoring the computing cam 123 to its normal position in position to cooperate with the roller 127. As the item "14" just printed was not introduced into the computing pinions, the latter still stand as before with the positive total of "200" registered therein.

Subtraction

The subtraction of an item of, say, "35" will now be described. The item "35" is set up in the differential mechanism by operation of the digit keys 217 just as for addition, operating the "3" and the "5" keys in the order named. The lever 73 stands in its rearward position, and is now moved into the forward or subtracting position, which movement of said lever 73 places the mechanisms of the machine in the adjustments shown in Fig. 22, in which positions the racks 29 are driven by the type plates 10 through the rack segments 14 and the rack segments 24. The bails 59 and 70 and the plate 40 carrying the bars 51 and 52 are shifted forwardly, the blades 27 and 28 are each rotated approximately ninety degrees so that the tines 22 of the members 20 are in engagement with the shaft 17, and the plate 196 with the arm 195 on the special character type plate 10 is moved a distance rearwardly sufficient to permit the special character type plate 10 to move upwardly when the bail 95 rises.

Now, upon depression of the motor clutch bar 88, the shaft 85 turns a complete revolution and the following movements and operations take place: The bail 63 moves upwardly a very slight distance as before. Due to the changed adjustments for subtraction just described, however, upward movement of the levers 43 is prevented through the hooks 49a engaging with the bar 51. The computing pinions 30, as before, move out of engagement with the racks 29 and the bail 95 rises. The units and tens type plates 10 now rise as permitted by the operated digit stop "3" in tens order and the digit stop "5" in units order, and the special character type plate also rises as permitted by the present adjustment of its plate 194 with respect to the abutment arm 135 on the total shaft 128. As a result, the units type plate presents the "5" type, the tens type plate the "3" type, and the special type plate presents the minus sign (—) at the printing line of the platen. The racks 29, now out of engagement with the computing pinions 30, move in a counter-clockwise direction (Fig. 22) as the units and tens type plates rise. Type hammers 117 in appropriate orders are now released and the item "35" is printed, together with the minus (—) sign to show that it has been subtracted, so that the item printed appears "35—".

The computing pinions 30 are now reengaged with the racks 29, and as the bail 95 moves downwardly the three operated type plates are forced down to normal position, the units and tens plates through their rack segments 14 moving the racks 29 in a clockwise direction and thus actuating the units and tens computing pinions in a counter-clockwise direction, the former to the extent of five and the latter to the extent of three unit spaces and thereby effecting the subtraction of "5" in units and "3" in tens order.

As both the units and the tens computing pinions stood at "0" with their carrying lugs 35 just to the right of the blades 48 (Fig. 22), the movements of the two pinions just described push the units and tens hooks 49a from the bar 51 and the corresponding levers 43 rise until engaged by the bail 63. The printing hammers 117 and the stop carriage with the operated digit stops are all restored to their starting positions.

The computing pinions 30 are now moved into engagement with the carrying racks 36, whereupon the bail 63 is drawn upwardly into idle position, and the two released levers 43 rise to permit carrying movement of the carrying racks 36 in tens and hundreds orders, respectively. Due to the shifted relation of the bail 70, the direction of this carrying movement will now be to the left as seen in Fig. 22 and, as a result, each of the two computing pinions will be rotated an additional unit space in a counter-clockwise direction, after which the condition of the computing pinions will be as follows: The pinion in hundreds order, which had previously registered "2", will be moved back to "1"; the tens pinion, which had been moved backwardly from "0" the distance of three units by its rack 29 and the additional distance of one unit by its carrying rack, will now stand four unit spaces back of "0", or at "6"; and the units computing pinion, which had been moved backwardly from "0" the distance of five units by its rack 29 and was unaffected by carrying will now stand at "5": So that the amount now registered is shown by the pinions to be "165".

The computing pinions 30 now reengage with the racks 29 and the bail 63 descends to its lowest position as before, restoring the carrying racks 36 which had operated and forcing the levers 43 down to carry the hooks 49a into relatching position below the bar 51.

Taking a sub-total

Suppose that it now be desired to record the amount registered in the machine without clearing the computing pinions, and also that the operator does not know whether the total in the machine is positive or negative: The lever 73 is still in its forward or negative position, and before disturbing its adjustment the operator endeavors to depress the sub-total key 139.

As a matter of fact, as I have already shown, the machine contains the positive total "165" and therefore the finger 175 attached to the special computing pinion 171 (Figs. 20 and 24) is in engagement with the shaft 34, and the abutment 173a is in its lower position where it is in horizontal registry with the nose 163 on the total-key locking plate 161; and, as the machine is in the adjustment for subtraction, the said nose 163 has been forced into its right hand position where it is likewise in lateral registry with the said finger 173a. That is to say, the finger 173a stands squarely in the path of the nose 163 so that the plate 161 and its entire train of connections up to and including the sub-total key 139 are blocked and cannot be moved. The resistance of the sub-total key informs and signals the operator that the total in the machine is positive so that he thereupon moves the lever 73 rearwardly to the adding position. This, among other things, causes the nose 163 and the plate 161 to be shifted to the left by the spring 168 a distance sufficient to clear the abutment 173a. When the operator now places pressure on the sub-total key 139 it yields and is easily depressed to operative position, and the universal zero abutment plate 144 is moved forwardly out of the paths of the heels 144a of the type plates 10. The computing cam 123 is also moved out of operative relation with the roller 127 on the computing pinions cradle 32. The various mechanisms now occupy the adjustments shown in Fig. 20.

When, therefore, the motor clutch bar 88 is operated and revolution of the cam shaft 85 occurs and the bail 95 is lifted all of the type plates 10 will tend to rise through the force of their springs 98; and because of the engaged relation of the racks 29 and the computing pinions 30 the latter will be impelled in a counter-clockwise direction (Fig. 20). Such of the accumulating pinions as are already in their positive clear position with their carrying lugs 35 immediately to the right of the blade 48 will be thereby blocked from any movement whatever, as the blades 48 in this adjustment cannot move to the left because of the bar 52 with which they are in close contact. The entire trains of connections in these orders, from the pinions 30 through the racks 29 to the type plates 10 will, therefore, remain stationary. The hundreds pinion, however, which stands at "1", will move in a counter-clockwise direction the distance of one unit; the tens pinion which stands at "6", will move in like direction the distance of six units; and the units pinion, which stands at "5" will move similarly the distance of five units; and the respective type plates 10 will move upwardly corresponding distances and in so doing will position types at the printing line of the platen representing the amount "165", to be recorded through operation of the hammers 117.

In the starting position of the total shaft 128 during an operation of the machine in the adding adjustment no movement of the special character plate 10 can occur due to the position of the abutment arm 135. Rocking of the shaft 128 by the aforesaid depression of the sub-total key 139, however, moved the abutment arm 135 a distance sufficient to allow the character type plate to move upwardly a distance sufficient to present at the printing line of the platen a type carrying the sub-total symbol (s). As printed, the total "165" will therefore be accompanied by the sub-total symbol, thus, "165s", identifying it as a sub-total taken in the positive adjustment of the machine, or a positive sub-total. The computing pinions are now moved out of engagement with the racks 29 and the bail 95 returns the operated type plates 10 to idle position. The computing pinions are then reengaged with the racks 2a while the carrying mechanism restoring devices function (unnecessary, of course, in this instance). Near the completion of the revolution of the cam shaft 85 the total key is unlatched and both the total key and the total shaft with the computing cam 123 return to their normal positions.

*Subtracting more than the amount registered in the machine*

Having taken only a sub-total, the amount "165", of course, still remains in the machine. Let it now be assumed that the next item is "175" and that it is to be subtracted: The item "175" is set up in the differential mechanism by operation of the digit keys 217 in the manner already explained. Observing that the lever 73 is set for addition, it is moved forwardly into the position for subtraction. This conditions the various mechanisms of the machine, as shown in Fig. 22. The motor clutch bar 88 is now depressed and, as the cam shaft 85 performs its revolution, the operations and movements already explained in detail in connection with "Subtraction" take place. In the instant example, the units type plate 10 rises five unit spaces, the tens type plate rises seven unit spaces and the hundreds type plate rises one unit space. In the manner already explained the special character type plate 10 is also permitted to rise as required to present a character at the printing line denoting subtraction, the minus sign (—). Suitable printing hammers 117 now operate and the amount of the item with the indication that it was subtracted is printed, thus, "175—".

Return movement to idle position of the hundreds type plate 10 will, of course, result in rotation of the hundreds computing pinion 30 to the extent of one unit in the direction for subtraction, that is to say, in a counter-clockwise direction as the parts are seen in Fig. 22; return of the tens type plate will cause rotation of the tens computing pinion seven unit spaces; and return of the units type plate will cause rotation of the units computing pinion the distance of five unit spaces in the same direction. In other words, the hundreds computing pinion, which previously stood at "1", will be moved back one unit space to its positive clear or "0" position; the tens pinion, which stood at "6", will be moved back seven unit spaces past the "0" to the "9" position; and the units pinion, which previously stood at "5", will be moved back five unit spaces, bringing it also to the "0" position. The computing pinion in tens order in moving back the seven unit spaces just referred to carried one of its lugs 35 against the blade 48 as it moved past the "0" to the "9" position and pushed the hook 49a clear of the bar 51, thereby unlocking the lever 43 in tens denominational order for carrying.

When the computing pinions 30 engage with the carrying racks 36 and the bail 63 moves upwardly out of the path of the levers 43 the released lever 43 in tens order will immediately rise, freeing its carrying rack 36, which is located in hundreds order; and the latter will immediately rotate the hundreds computing pinion 30 (which had already been moved by its rack 29 from the "1" back to the "0" position) one unit space, moving it back to its "9" position. In this movement the lug 35 on the hundreds computing pinion engaged with the blade 48 and unlatched the lever 43 in hundreds order. The bail 63 is now elevated to inoperative position, so that the released lever 43 is not engaged and halted thereby, but immediately releases the carrying rack 36 in thousands order. The computing pinion 30 in thousands, as well as the computing pinions in all of the higher denominational orders, stands at "0", and the thousands pinion, as well as all the others in orders above thousands, will receive a retrograde carrying movement of one unit space, moving them all from the "0" to the "9" position. In other words, "carrying across the machine" occurs, beginning at hundreds order. When the lever 43 in highest order is released by its computing pinion passing from "0" to "9" position it releases the carrying rack 36 controlling the special pinion 171 located to the left of the computing pinion of highest denominational order, imparting one space of movement thereto in the same direction. This moves the special pinion 171 from its positive position, in which the arm 175 is in contact with the shaft 34, to its negative position in which the arm 174 engages the shaft 34. The pinion 171a, which is mounted on the shaft 31 immediately to the right of the computing pinion 30 of lowest denominational order, is joined to the special pinion 171 by a connection or web 181 (Fig. 24) and will, therefore, partake of the one-space counter-clockwise movement of the pinion 171; and by means of a lug 35 similar to the carrying lugs 35 on the computing pinions displaces the blade 48 and thereby releases the lever 43 controlling the carrying rack 36 in units order, which is released and rotates units computing pinion 30 to the extent of one unit, moving it from the "0" position, where its racks 29 had moved it, to the "9" position. In other words, the fugitive "1" is introduced into the units computing pinion. This movement of the units computing pinion resulted in unlatching its lever 43 and permitting the carrying lever 36 in tens order to transmit a carry movement to the tens computing pinion, moving it from the "9" position to which its rack 29 had moved it to the "8" position. This last movement of the tens computing pinion did not carry one of its lugs 35 against the blade 48 in that order to release its lever 43, and the cycle of carrying initiated by the hundreds computing pinion and transmitted through units pinion here terminates.

As a result of the movements of the computing pinions 30 by the racks 29 and the carrying racks 36 which have just been described, it will be seen that all of said pinions now stand at the "9" position with their carrying lugs 35 just to the left of the blades 48 with the single exception of the pinion in tens order, which stands in the "8" position with its lug 35 one unit space to the left of its blade 48. This signifies that if a totaling operation now occurred no type plate 10 except that in tens order would move and that only to the extent of one unit space, meaning that there is a negative total of "10" in the machine. If the computing pinions 30 could be cleared in a counter-clockwise direction the total printed (in a machine having nine orders) would be 999999989, but the special pinion 171 is now in its negative position and the total key shaft locking mechanism will accordingly permit only a negative total to be taken.

*Taking a negative total*

It may be assumed that the operator does not know whether the total in the machine is positive or negative. As in the case of the sub-total previously described, however, the operator attempts to depress the total key without disturbing the adjustment of the lever 73. It is now desired to take a total and to leave the computing pinions clear, and the operator, therefore, tries the total key 140 instead of the sub-total key. He finds that the total key is not locked and depresses it. The operator now knows that the machine contains a negative total or, at least, that the computing pinions are in a negative condition. The total may, therefore, be taken without disturbing the adjustment of the lever 73, which occupies its forward position with the nose 163 pushed to the right so that it passes by the abutment 172ª now in horizontal alinement therewith.

Operation of the total key 140 rotates the total shaft 128 moves the computing cam 123 out of position to cooperate with the roller 127 and the total cam 124 into its place, where it will control meshing and unmeshing of the computing pinions 30 through said roller 127. The universal digit stop plate 144 is also moved to an inoperative position, and the abutment arm 135 is moved to allow movement of the special character plate 10 to the extent necessary to position the negative total sign "*" at the printing line. Therefore, when the bail 95 is elevated, the special character plate rises to position the negative total sign, and all of the other type plates 10 likewise rest until the lugs 35 on their respective computing pinions 30 with which they are entrained are arrested by engagement with their blades 48.

It will be remembered that the preceding operation left the computing pinions adjusted respectively as follows: 999999989, the lugs 35 of all of the computing pinions being in engagement with their blades 48 with the single exception of the pinion in tens denominational order, which stood one unit space removed, or in the "8" position. Therefore, elevation of the bail 95 will result in the movement of only the type plate 10 in tens order, and that to the extent of one unit space only. This brings a "1" type to the printing line of the platen and results in the printing of the negative total of "10" thus "10*", the negative total sign showing that it is a negative total and also that the computing pinions of the machine were left in a clear condition.

Concluding the cycle of operations, the computing pinions are now moved out of engagement with the racks 29 and the bail 95 with the operated type plates 10 is returned to normal position, whereupon the computing pinions are re-engaged with the racks 29 while the carrying mechanisms restoring devices go through their movements, which in this case are, of course, idle and of no effect. As the cam shaft 85 completes its revolution the total key 140 is unlatched and assumes its normal position.

The machine having been cleared through the taking of a negative total, the computing pinions stand in their negative clear position with their lugs 35 alined to the left of the blades 48, as seen in Fig. 22.

I claim:—

1. A calculating machine comprising a series of calculating pinions, a rack normally in mesh with each of said calculating pinions for movement in opposite directions from and to starting positions, mechanism for moving said racks in one direction from a starting position to rotate said pinions in examples of straight addition and for moving said racks in the opposite direction from said starting position to rotate said pinions in the opposite direction in examples of subtraction, and mechanism for operating said pinions to transfer from lower to higher denominational orders.

2. A calculating machine comprising a series of longitudinally movable slides, mechanism for limiting extent of longitudinal movement of said slides, a series of calculating pinions, a series of racks meshing with said calculating pinions, and a series of mechanisms each restricted to movement in a single plane and operated by a corresponding one of said slides during movement of said slides in one direction for operating said series of racks in either direction from a starting position to turn said pinions in one direction or in another direction, as desired.

3. A calculating machine comprising a series of longitudinally movable slides, mechanism for limiting extent of longitudinal movement of said slides, a series of calculating pinions, a series of racks for operating said calculating pinions in calculating and clearing movements, and mechanism operated by said slides during movement of said slides in one direction for operating said series of racks in either direction from a starting position to rotate said pinions in one direction for addition and in another direction for subtraction.

4. A calculating machine comprising a series of longitudinally movable slides, mechanism for limiting extent of longitudinal movement of said slides, a series of calculating pinions, a series of racks for operating said calculating pinions in accumulating and clearing movements, mechanism operated by said slides for operating said series of racks in either direction from a starting position to rotate said pinions in one direction for addition and in another direction for subtraction, transfer devices for said pinions, and means for operating said transfer devices to actuate said pinions in either direction.

5. A calculating machine comprising a series of calculating pinions, a series of racks operative in either direction from a starting position to rotate said pinions in either direction in accumulating operations and in either direction in clearing operations, gear devices for operating said racks in one direction, other gear devices for operating said racks in another direction, and mechanism for limiting and controlling extent of movement of said gear devices.

6. A calculating machine comprising a series of calculating pinions, a series of racks operative in either direction from a starting position to rotate said pinions in either direction, gear devices for operating said racks in one direction, other gear devices for operating said racks in another direction, the movements of each denominational train of said racks and said gear devices being restricted to a single uniform plane, mechanism for limiting and controlling extent of movement of said gear devices, and transfer mechanism cooperating with said pinions to actuate said pinions in either direction for transferring.

7. A calculating machine comprising a series of calculating pinions, a series of racks for operating said calculating pinions, mechanism for operating said racks in either direction from a single starting position to rotate said calculating pinions in either direction as desired in both calculating and clearing movements, transfer mechanism for said pinions, and means for controlling said transfer mechanism to actuate said pinions in either direction in transferring operations.

8. A calculating machine comprising calculating pinions, racks for operating said pinions, mechanism for rotating said pinions by operation of said racks in either direction from a single starting position, a series of racks for operating said pinions in transferring operations, actuators for said second racks, and means for causing said actuators to operate said second racks in one direction in transferring in examples of addition and in another direction in transferring in examples of subtraction.

9. A calculating machine comprising a series of calculating pinions, pivoted racks engageable with said pinions to rotate said pinions in one direction for addition and in the other direction for subtraction, mechanism for operating said racks in one direction from a starting position to rotate said pinions in one direction for addition, mechanism for operating said racks in the other direction from said starting position to rotate said pinions in the opposite direction for subtraction, transfer racks mechanism co-operating with said pinions irrespective of their direction of rotation, and means for controlling said transfer racks to actuate said pinions in one direction for transfer in examples of addition and in the opposite direction for transfer in examples of subtraction.

10. A calculating machine comprising calculating pinions, racks for rotating said calculating pinions, transfer mechanism for operating said calculating pinions in transferring operations, a series of slides, and elements each operated in a single plane by said slides for turning said racks in opposite directions selectively as aforesaid.

11. A calculating machine comprising a series of calculating pinions, a series of pivoted racks for turning said pinions in opposite directions, a series of longitudinally movable slides, racks in connection with said slides, and mechanism operative optionally by certain of said second racks for turning said first racks in one direction from a starting position or by certain others of said racks in connection with said slides for turning said first racks in the other direction.

12. A calculating machine comprising a series of calculating pinions, a series of pivoted racks for turning said pinions in opposite directions, a series of longitudinally movable slides, racks in connection with said slides, mechanism operative optionally by certain of said second racks for turning said first racks in one direction from a starting position or by certain others of said racks in connection with said slides for turning said first racks in the other direction, a series of racks for operating said pinions in transfer operations, and mechanism for operating said last named racks in one direction for transferring in addition and in the opposite direction for transferring in subtraction.

13. A calculating machine comprising a series of calculating pinions, racks meshing with said calculating pinions for movements respectively in opposite directions from and to a single starting position, mechanism for moving said racks in one direction from said starting position to rotate said pinions in one direction in examples of addition and in the opposite direction in examples of subtraction, transfer mechanism for operating said pinions to transfer from lower to higher denominational orders, and means controlling operation of a part of said transfer mechanism to introduce the fugitive I in units denominational pinion only in examples of subtraction.

14. A calculating machine comprising a series of longitudinally movable slides, mechanism controlling extent of longitudinal movement of said slides, a series of calculating pinions, a single series of racks meshing with said calculating pinions, mechanism restricted to a single uniform plane of movement operated by said slides for operating said racks to turn said pinions in one direction or in another direction as desired, and transfer mechanism cooperating with said pinions irrespective of the direction of rotation of said pinions by said racks.

15. A calculating machine comprising a series of longitudinally movable slides, mechanism controlling extent of longitudinal movement of said slides, a series of calculating pinions, racks meshing with said calculating pinions, mechanism operated by said slides for operating said racks to turn said pinions in one direction or in another direction as desired, transfer mechanism cooperating with said pinions irrespective of the direction of rotation of said pinions by said racks, and means controlling operation of said transfer mechanism to introduce the fugitive 1 in units denominational pinion when said pinions are turned in one direction by said racks.

16. A calculating machine comprising a series of longitudinally movable slides, mechanism for controlling extent of longitudinal movement of said slides, a series of calculating pinions, a series of racks for operating said calculating pinions, mechanism restricted to a single uniform plane of movement operated by said slides for operating said racks in either direction from a single starting position to rotate said pinions in one direction for addition and in another direction for subtraction, elements controlled by said pinions for actuating said pinions in transfer operations irrespective of the direction of rotation of said pinions, and means for moving said pinions to and from engagement with said racks and said elements respectively.

17. A calculating machine comprising a series of longitudinally movable slides, mechanism for controlling extent of longitudinal movement of said slides, a series of calculating pinions, a series of racks for operating said calculating pinions, mechanism operated by said slides for operating said racks in either direction from a starting position to rotate said pinions in one direction for addition and in another direction for subtraction, elements controlled by said pinions for actuating said pinions in transfer operations irrespective of the direction of rotation of said pinions, means for moving said pinions to and from engagement with said racks and said elements respectively, and means controlling operation of said elements to introduce the fugitive 1 in units denominational pinion in examples of subtraction.

18. A calculating machine comprising a series of longitudinally movable slides, stops for limiting extent of longitudinal movement of said slides, a series of calculating pinions, racks operative by said slides for rotating said calculating pinions, mechanism restricted to a single uniform plane of movement operated by said slides for operating said racks in either direction from a single starting position to rotate said pinions in one direction for addition and in the opposite direction for subtraction, and transfer devices for operating said pinions in transfer operations irrespective of the direction of rotation of said pinions by said racks.

19. A calculating machine comprising a series of longitudinally movable slides, stops for limiting extent of longitudinal movement of said slides, a series of calculating pinions, racks operative by said slides for rotating said calculating pinions, mechanism operated by said slides for operating said racks in either direction from a single starting position to rotate said pinions in one direction for addition and in the opposite direction for subtraction, transfer devices for operating said pinions in transfer operations irrespective of the direction of rotation of said pinions by said racks, and means controlling operation of said transfer devices to introduce the fugitive 1 in the pinion in units denominational order when said pinions are operating for subtraction.

20. A calculating machine comprising a series of calculating pinions, a series of pivoted racks for operating said calculating pinions in accumulating and clearing operations and having a definite starting position, gear devices for operating said racks in one direction from said starting position, other gear devices for operating said racks in the opposite direction from said starting position, and mechanism for limiting extent of movement of said gear devices.

21. A calculating machine comprising a series of calculating pinions, a series of pivoted racks for operating said calculating pinions in clearing and accumulating movements and having a definite starting position, gear devices for operating said racks in one direction from said starting position, other gear devices for operating said racks in the opposite direction from said starting position, mechanism for limiting extent of movement of said gear devices, and transfer racks for operating said calculating pinions in transfer operations irrespective of the direction of rotation of said pinions by said racks.

22. A calculating machine comprising a series of calculating pinions, a series of pivoted racks for operating said calculating pinions and having a definite starting position, gear devices for operating said racks in one direction from said starting position, other gear devices for operating said racks in the opposite direction from said starting position, mechanism for limiting extent of movement of said gear devices, transfer racks for operating said calculating pinions in transfer operations irrespective of the direction of rotation of said pinions by said racks, and mechanism controlling operation of said transfer mechanism to introduce the fugitive 1 in units denominational pinion in examples of subtraction.

23. A calculating machine comprising a series of calculating pinions, a series of pivoted racks movable in either direction from a definite starting position to rotate said pinions in one direction for addition and in the opposite direction for subtraction, gear devices for moving said racks in one direction from said starting position, other gear devices for operating said racks in the opposite direction from said starting position, mechanism controlling extent of movement of said gear devices irrespective of the direction of movement of said gear devices, transfer racks cooperating with said pinions to actuate said pinions in transferring operations, and mechanism for moving said pinions from engagement with said racks to engagement with said transfer racks.

24. A calculating machine comprising a series of calculating pinions, a series of pivoted racks movable in either direction from a definite starting position to rotate said pinions in one direction for addition and in the opposite direction for subtraction, gear devices for moving said racks in one direction from said starting position, other gear devices for operating said racks in the opposite direction from said starting position, mechanism controlling extent of movement of said gear devices irrespective of the direction of movement of said gear devices, transfer racks cooperating with said pinions to actuate said pinions in transferring operations, mechanism for moving said pinions from engagement with said racks to engagement with said transfer racks, and means controlling operating of said transfer racks to introduce the fugitive 1 in units denominational pinion when said pinions are operated in examples of subtraction.

25. A calculating machine comprising a series of calculating pinions, a shaft, a series of racks pivoted on said shaft for movement in either direction from a definite starting position, mechanism for moving said racks in either direction from said definite starting position to rotate said calculating pinions in either direction as desired, transfer racks for said pinions, means for shifting said pinions from engagement with said racks to engagement with said transfer racks, and means for controlling said transfer racks to actuate said pinions in either direction in transferring operations.

26. A calculating machine comprising a series of calculating pinions, a shaft, a series of racks pivoted on said shaft for movement in either direction from a definite starting position, mechanism for moving said racks in either direction from said definite starting position to rotate said calculating pinions in either direction as desired, transfer mechanism for said pinions, means for shifting said pinions from engagement with said racks to engagement with said transfer mechanism, means for controlling said transfer mechanism to actuate said pinions in either direction in transferring operations, and means for controlling operation of said transfer mechanism to introduce the fugitive 1 in units denominational pinion when said pinions are rotated in one direction.

27. A calculating machine comprising calculating pinions, mechanism movable in one direction from a definite starting position for rotating said pinions in one direction for subtraction and in the opposite direction from said starting position for addition, a series of racks for operating said pinions in transferring operations, actuators for said racks, mechanism for causing said actuators to operate said racks in one direction in transferring in examples of addition and in another direction in transferring in examples of subtraction, and means for controlling one of said racks to introduce the fugitive 1 in units denominational pinion in examples of subtraction.

28. A calculating machine comprising calculating pinions, mechanism for rotating said pinions in one direction for subtraction and in the opposite direction for addition, a series of racks for operating said pinions in transferring operations, actuators for said racks, mechanism for causing said actuators to operate said racks in one direction in transferring in examples of addition and in another direction in transferring in examples of subtraction, means for controlling one of said racks to introduce the fugitive 1 in units denominational pinion in examples of subtraction, and mechanism for clearing said pinions of any number represented therein.

29. A calculating machine comprising calculating pinions, mechanism movable in one direction from a definite starting position for rotating said pinions in one direction for subtraction and in the opposite direction from said starting position for addition, a series of racks for operating said pinions in transferring operations, actuators for said racks, mechanism for causing said actuators to operate said racks in one direction in transferring in examples of substraction, means for controlling one of said racks to introduce the fugitive 1 in units denominational pinion in examples of subtraction, and mechanism for rotating said pinions to a starting clear position irrespective of whether said pinions had been operated in examples of addition or in examples of subtraction.

30. A calculating machine comprising a series of calculating pinions, a series of pivoted racks, actuators for turning said racks in one direction from a definite starting position for addition and in the opposite direction from said definite starting position for subtraction each of said actuators having a single uniform plane of movement, a transfer rack for each pinion, mechanism for operating said transfer racks in one direction for addition and in another direction for subtraction, and mechanism for shifting said pinions from engagement with said pivoted racks to engagement with said transfer racks for transfer operations and from said transfer racks to said pivoted racks for adding and subtracting operations.

31. A calculating machine comprising a series of calculating pinions, mechanism for rotating said pinions in calculating operations, a pivoted rack corresponding to each pinion and being normally out of engagement with said pinions, mechanism for shifting said pinions to and from engagement with said pivoted racks, and actuators for said pivoted racks respectively for operating said racks in either of two directions from a definite starting position, as desired.

32. A calculating machine comprising a series of calculating pinions, actuators for said pinions, mechanism for moving said actuators in either of two directions from a single starting position, differential mechanism limiting extent of movement of said actuators irrespective of the direction of movement of said actuators, a transfer rack for each of said pinions, and actuators for said racks respectively for moving said racks in one direction in transferring in examples of addition and for moving said racks in the opposite direction in transferring in examples of subtraction.

33. A calculating machine comprising a series of pivoted racks, a series of calculating pinions engageable with said racks for rotation thereby in one direction for addition and in the other direction for subtraction, means for operating said racks from definite starting positions in one direction for addition and in the opposite direction for subtraction while said calculating pinions are engaged with said racks, and a series of transfer racks for operating said pinions in transferring operations irrespective of their direction of rotation.

34. A calculating machine comprising a series of pivoted racks, a series of calculating pinions engageable with said racks for rotation thereby in one direction for addition and in the other direction for subtraction, means for operating said racks from definite starting positions in one direction for addition and in the opposite direction for subtraction while said calculating pinions are engaged with said racks, a selector cooperating with the pinion to control the transfer rack in transferring movements, a single transfer rack for each pinion, an actuator for operating said transfer rack in one direction for transferring in addition and in the opposite direction for transferring in subtraction, and automatic mechanism for shifting said calculating pinions from engagement with said pivoted racks to engagement with said transfer racks.

35. A calculating machine comprising a series of calculating pinions, racks having a definite starting position and being movable in either direction from said definite starting position to turn said pinions in one direction for addition and in the opposite direction for subtraction, carrying racks for said pinions, an actuator for each carrying rack, means for adjusting said actuators to move the carrying racks in one direction for addition and in the opposite direction for subtraction, selecting devices operated by said pinions for selecting the proper carrying racks to operate in carrying, and means for restoring said carrying racks to their starting positions after operation.

36. A calculating machine comprising calculating pinions, mechanism movable in one direction from a starting position for rotating said pinions in one direction for addition and movable in the opposite direction from said starting position for rotating said pinions in the opposite direction for subtraction, settable means controlling the direction of movement of said mechanism from said starting position, carrying racks for operating said pinions in carrying operations in one direction for addition and in the opposite direction for subtraction, actuators for said carrying racks, and means for causing said actuators to operate said carrying racks in either of said directions, as desired.

37. A calculating machine comprising calculating pinions, mechanism movable in one direction from a starting position for rotating said pinions in one direction for addition and movable in the opposite direction from said starting position for rotating said pinions in the opposite direction for subtraction, settable means controlling the direction of movement of said mechanism from said starting position, carrying racks for operating said pinions in carrying operations in one direction for addition and in the opposite direction for subtraction, actuators for said carrying racks, means for causing said actuators to operate said carrying racks in either of said directions, as desired, and selecting devices operated by said pinions for selecting the carrying racks to be operated.

38. A calculating machine comprising longitudinally movable slides, calculating pinions, carrying racks for said pinions, operating racks for said pinions, means for shifting said pinions from engagement with said operating racks to said carrying racks, and mechanism for moving said operating racks by said slides in either direction from a definite starting position by movement of said slides in one direction.

39. A calculating machine comprising longitudinally movable slides, calculating pinions, carrying racks for said pinions, operating racks for said pinions, means for shifting said pinions from engagement with said operating racks to said carrying racks, mechanism for moving said operating racks by said slides in either direction from a definite starting position by movement of said slides in one direction, and mechanism for operating said carrying racks in either direction from a definite starting position as required in carrying from lower to higher denominational orders in examples of addition and in examples of subtraction.

40. A calculating machine comprising calculating pinions, a pivoted rack having a definite starting position for operating each of said calculating pinions, slides movable from and to a definite starting position, and mechanism restricted to a single plane of movement operative by each of said slides for operating the corresponding rack in one direction from said starting position of said rack for addition and in the opposite direction from said starting position of said rack for subtraction as required for the proper performance of said work.

41. A calculating machine comprising calculating pinions, a pivoted rack for operating each of said calculating pinions, slides movable from and to a definite starting position, mechanism operative by each of said slides for operating the corresponding rack in one direction for addition and in the opposite direction for subtraction as required for the proper performance of said work, a transfer rack for each pinion, and a device for operating said transfer rack in one direction from a definite starting position to transfer in examples of addition and in the opposite direction from said definite starting position to transfer in examples of subtraction.

42. A calculating machine comprising a series of calculating pinions, a series of slides having a definite starting position, mechanism for operating said slides from and to said starting position, a series of racks having definite starting positions and engaged with said calculating pinions during return movement of said slides to starting positions, and mechanism having a uniform plane of movement for operating each of said racks by a corresponding one of said slides in either direction from said definite starting positions of said racks during movement of said slides to their starting positions.

43. A calculating machine comprising a series of calculating pinions, a series of slides having a definite starting position, mechanism for operating said slides from and to said starting position, a series of racks engaged with said calculating pinions during return movement of said slides to starting positions, a series of mechanisms for operating each of said racks by a corresponding slide in either direction during movement of said slides to their starting positions and each of said mechanisms having a uniform plane of movement, transfer mechanism arranged to be conditioned to operate said calculating pinions in one direction for addition and in the opposite direction for subtraction, and automatic means for conditioning said transfer mechanism for said operation in accordance with the direction in which said racks are to be operated by said slides.

44. A calculating machine comprising a series of calculating pinions, a rack for each of said pinions having a definite starting position and operable to rotate the pinions in accumulating and in clearing operations, means for holding said pinions in engagement with said racks, and mechanism for operating said racks in either direction from said starting position and thereby rotating said pinions in one direction for addition and in the opposite direction for subtraction.

45. A calculating machine comprising a series of calculating pinions, a rack for each of said pinions having a definite starting position, means for holding said pinions in engagement with said racks for rotation in clearing and accumulating movements, mechanism for operating said racks in either direction from said starting position and thereby rotating said pinions in one direction for addition and in the opposite direction for subtraction, transfer devices for said pinions, and automatic mechanism for conditioning said transfer devices for operation in one direction for addition and in the opposite direction for subtraction when it is intended to operate said racks for addition or subtraction.

46. A calculating machine comprising calcuating pinions mounted for rotation in one direction for addition and in the opposite direction for subtraction, a rack for each of said pinions having a definite starting position, means for holding said pinions in mesh with said rack for operation thereby, mechanism for moving said racks in one direction for addition and in the opposite direction for subtraction and thereby rotating said pinions in one direction for addition and in the opposite direction for subtraction, transfer racks for said pinions, and mechanism for operating said transfer racks in one direction in transferring in examples of addition and in the opposite direction in transferring in examples of subtraction.

47. A calculating machine comprising calculating pinions mounted for rotation in one direction for addition and in the opposite direction for subtraction, a rack for each of said pinions having a definite starting position, means for holding said pinions in mesh with said rack for operation thereby, mechanism for moving said racks in one direction for addition and in the opposite direction for subtraction and thereby rotating said pinions in one direction for addition and in the opposite direction for subtraction, transfer racks for said pinions, mechanism for operating said transfer racks in one direction in transferring in examples of addition and in the opposite direction in transferring in examples of subtraction, selecting devices controlled by said pinions for selecting the proper transfer racks for operation, and mechanism for moving said pinions from engagement with said first named racks to engagement with said transfer racks, and vice versa.

48. A calculating machine comprising a series of racks having definite starting positions, a series of slides, mechanism for moving said racks by said slides in either direction from said definite starting positions by movements of said slides in a single direction, calculating pinions, and means for holding said calculating pinions in or out of engagement with said racks as desired during movement of said racks to their starting positions.

49. A calculating machine comprising a series of racks having definite starting positions, actuators, mechanism movable in a single plane and operative by each of said actuators for moving the corresponding one of said racks in either direction from said definite starting positions and for returning said racks to said definite starting positions, calculating pinions, and mechanism for operating said calculating pinions during return movement of said racks to their starting positions irrespective of the direction of such return movement.

50. A calculating machine comprising a series of racks having definite starting positions, actuators, mechanism operative by said actuators for moving said racks in either direction from said definite starting positions and for returning said racks to said definite starting positions, calculating pinions, mechanism for operating said calculating pinions during return movement of said racks to their starting positions irrespective of the direction of such return movement, and mechanism for optionally preventing operation of said calculating pinions during any of the movements of said racks.

51. A machine of the character described comprising calculating pinions, a series of racks for engaging and operating said pinions, mechanism for moving said racks selectively in either direction from a definite starting position to rotate said pinions in one direction for addition and in the opposite direction for subtraction, and mechanism for holding said pinions engaged with said racks during movement of said racks from said starting positions and disengaging said pinions from said racks before said racks start on their return movements to said starting positions.

52. A calculating machine comprising a series of racks, mechanism for moving said racks optionally in either direction from definite starting positions and returning said racks to said positions, a series of calculating pinions rotatable by the racks in accumulating and clearing movements, mechanism for holding said calculating pinions disengaged from said racks during movements of said racks from said starting positions and holding said pinions engaged with said racks during movements of said racks toward their starting positions irrespective of the direction of movement of said racks, and transfer mechanism cooperative with said pinions in transferring from lower to higher denominational orders irrespective of the direction of rotation of said pinions by said racks.

53. A calculating machine comprising a series of racks, mechanism for moving said racks optionally in either direction from definite starting positions and returning said racks to said positions, a series of calculating pinions, mechanism for holding said calculating pinions disengaged from said racks during movements of said racks from said starting positions and holding said pinions engaged with said racks during movements of said racks toward their starting positions irrespective of the direction of movement of said racks, transfer mechanism cooperative with said pinions in transferring from lower to higher denominational orders irrespective of the direction of rotation of said pinions by said racks, and subtotal mechanism for holding said pinions in engagement with said racks during movements of said racks in one direction from said starting positions and during return movements of said racks to said starting positions.

54. A calculating machine comprising a series of racks, mechanism for moving said racks optionally in either direction from definite starting positions and returning said racks to said positions, a series of calculating pinions, mechanism for holding said calculating pinions disengaged from said racks during movements of said racks from said starting positions and holding said pinions engaged with said racks during movements of said racks toward their starting positions irrespective of the direction of movement of said racks, transfer mechanism, selecting devices cooperative with said pinions to control operation of the transfer mechanism in transferring from lower to higher denominational orders irrespective of the direction of rotation of said pinions by said racks, and clearing mechanism for holding said pinions in engagement with said racks during movement of said racks in one direction from said starting positions and disengaging said pinions from said racks before return movement of said racks toward said starting positions.

55. A calculating machine comprising a series of racks, mechanism for optionally moving said racks in either direction from definite starting positions and for returning said racks to said starting positions, a series of calculating pinions rotative by said racks during their return movements to said starting positions irrespective of the direction of such return movements, and transfer racks controlled by said pinions for transferring from lower to higher denominational orders.

56. A calculating machine comprising a series of racks, mechanism for optionally moving said racks in either direction from definite starting positions and for returning said racks to said starting positions, a series of calculating pinions rotative by said racks during their return movements to said starting positions irrespective of the direction of such return movements, transfer racks controlled by said pinions for transferring from lower to higher denominational orders, and mechanism for operating said transfer mechanism to complete a transfer operation as an incident to the entry in said calculating pinions of any item requiring transfer.

57. A calculating machine comprising a series of racks, mechanism for optionally moving said racks in either direction from definite starting positions and for returning said racks to said starting positions, a series of calculating pinions rotative by said racks during their return movements to said starting positions irrespective of the direction of such return movements, transfer mechanism controlled by said pinions for transferring from lower to higher denominational orders, mechanism for operating said transfer mechanism to complete a transfer operation as an incident to the entry in said calculating pinions of any item requiring transfer, and clearing mechanism cooperating with said racks for operating said pinions in a clearing operation after entry of any item in said pinions.

58. A calculating machine comprising a series of calculating pinions, mechanism movable in one direction from a starting position for rotating said calculating pinions in one direction for addition and movable in the opposite direction from said starting position for rotating said pinions in the opposite direction for subtraction, settable means controlling the direction of movement of said mechanism from said starting position, a transfer rack for each pinion, and mechanism for operating said transfer racks to turn said pinions in one direction in transferring for addition and to turn said pinions in the opposite direction in transferring for subtraction.

59. A calculating machine comprising a series of calculating pinions, mechanism movable in one direction from a starting position for rotating said calculating pinions in one direction for addition and movable in the opposite direction from said starting position for rotating said pinions in the opposite direction for subtraction, a transfer rack for each pinion, mechanism for operating said transfer racks to turn said pinions in one direction in transferring for addition and to turn said pinions in the opposite direction in transferring for subtraction, means for conditioning said mechanism for movement in either direction from said starting position to rotate said pinions in either direction as aforesaid, and automatic means for conditioning said transfer racks for operation in either direction as aforesaid as an incident to the condition of said operating mechanism.

60. A calculating machine comprising a series of longitudinally movable slides, a series of pivoted racks engaged with and operated by said slides, a series of pivoted racks disengaged from said slides, means for operating said second pivoted racks by said slides or by said first pivoted racks as desired, and calculating pinions operated by said second pivoted racks.

61. A calculating machine comprising a series of longitudinally movable slides, a series of pivoted racks engaged with and operated by said slides, a series of pivoted racks disengaged from said slides, racks for operating said second series of pivoted racks by said first series of pivoted racks or by said slides as desired, and calculating pinions operated by said second pivoted racks.

62. A calculating machine comprising a series of longitudinally movable slides, a series of pivoted racks engaged with and operated by said slides, a series of pivoted racks disengaged from said slides, racks for operating said second series of pivoted racks by said first series of pivoted racks or by said slides as desired, calculating pinions operated by said second pivoted racks, and transfer mechanism controlled by said pinions to operate said pinions in transferring operations.

63. A calculating machine comprising a series of longitudinally movable slides, a series of pivoted racks engaged with and operated by said slides, a series of pivoted racks disengaged from said slides, racks for operating said second series of pivoted racks by said first series of pivoted racks or by said slides as desired, calculating pinions operated by said second pivoted racks, transfer mechanism controlled by said pinions to operate said pinions in transferring operations, and means for operating said transfer mechanism to operate said pinions in one direction for transferring in addition and in the opposite direction for transferring in subtraction.

64. A calculating machine comprising a series of sliding racks, a series of pivoted racks engaged with and operated by said sliding racks, a series of pivoted racks disengaged from said sliding racks, a series of devices movable from engagement with said sliding racks to engagement with said first series of pivoted racks for operating said second series of pivoted racks in said sliding racks or in said first series of pivoted racks as desired, and calculating pinions operated by said second series of pivoted racks in calculating operations.

65. A calculating machine comprising a series of sliding racks, a series of pivoted racks engaged with and operated by said sliding racks, a series of pivoted racks disengaged from said sliding racks, a series of devices movable from engagement with said sliding racks to engagement with said first series of pivoted racks for operating said second series of pivoted racks in said sliding racks or by said first series of pivoted racks as desired, calculating pinions operated by said second series of racks in calculating operations, and transfer mechanism controlled by said calculating pinions to complete a transfer operation in said pinions at each cycle of operation of said second pivoted racks from and to starting positions.

66. A calculating machine comprising a series of longitudinally movable racks, a series of pivoted racks engaged with and operated by said first named racks, a series of pivoted racks disengaged from said first named racks and from said pivoted racks, devices for operating said second pivoted racks from said first named racks or from said first series of pivoted racks, calculating pinions, and means for moving said calculating pinions to and from engagement with said second series of pivoted racks for operation thereby during return movement of said second pivoted racks to their starting positions.

67. A calculating machine comprising a series of longitudinally movable racks, a series of pivoted racks engaged with and operated by said first named racks, a series of pivoted racks disengaged from said first named racks and from said pivoted racks, devices for operating said second pivoted racks from said first named racks or from said first series of pivoted racks, calculating pinions, means for moving said calculating pinions to and from engagement with said second series of pivoted racks for operation thereby during return movement of said second pivoted racks to their starting positions, and clearing mechanism for holding said calculating pinions in engagement with said second pivoted racks during movement of said second pivoted racks from their starting positions.

68. A calculating machine comprising a series of longitudinally movable slides, a series of pivoted racks engaged with and operated by said slides, a series of calculating pinions, a series of racks, for operating said calculating pinions, and means for operating said last series of racks by said slides or by said pivoted racks as desired.

69. A calculating machine comprising a series of longitudinally movable slides, a series of pivoted racks engaged with and operated by said slides, a series of calculating pinions, a series of racks for operating said calculating pinions, means for operating said last series of racks by said slides or by said pivoted racks as desired, causing said second racks to rotate said pinions in one direction when said second racks are operated by said pivoted racks and in another direction when said second racks are operated by said slides, and transfer mechanism controlled by said pinions.

70. A calculating machine comprising, series of stops, keys for moving said stops to effective position, longitudinally movable slides controlled by said stops, a series of pivoted racks in engagement with said slides, a series of pivoted racks out of engagement with said slides, means for operating said second pivoted racks by said slides or by said first pivoted racks as desired, and calculating mechanism operated by said second pivoted racks.

71. A calculating machine comprising a series of pivoted racks, mechanism for turning said racks in one direction from and to a starting position or in the opposite direction from and to said starting position as desired, actuating elements for operating said mechanism, calculating pinions, and mechanism for operating said calculating pinions by said pivoted racks or not as desired when said actuating elements operate.

72. A calculating machine comprising a series of pivoted racks, mechanism for turning said racks in one direction from and to a starting position or in the opposite direction from and to said starting position as desired, actuating elements for operating said mechanism, calculating pinions, mechanism for operating said calculating pinions by said pivoted racks or not as desired when said actuating elements operate, and transfer mechanism cooperating with said calculating pinions irrespective of the direction of movement of said pivoted racks.

73. The combination in a calculating machine, of a series of denominational calculating pinions, a single series of racks directly engageable with said pinions for rotating the pinions in one direction in addition and in the opposite direction in subtraction, a second series of racks for rotating the pinions in carrying, and means controlled by the second series of racks to introduce the fugitive I in units denominational pinion when the sum accumulated in the pinions changes to negative.

74. The combination in a calculating machine, of a series of denominational calculating pinions, a single series of actuators directly engageable with said pinions for rotating the pinions in either direction in accumulating operations and also in clearing operations, a second series of actuators for rotating the pinions in carrying, and means controlled by the second series of actuators to prevent a clearing operation when the sum accumulated in the pinions changes to negative.

75. The combination in a calculating machine of a series of denominational calculating pinions, a single series of actuators directly engageable with said pinions for rotating the pinions in either direction in accumulating operations and also in clearing operations, a second series of actuators for rotating the pinions in carrying, and means controlled by the second series of actuators to introduce the fugitive I in units denominational pinion when the sum accumulated in the pinions changes to negative and also to prevent a clearing operation.

76. In a calculating machine, a series of denominational calculating pinions, a series of actuators for rotating the pinions in either direction in accumulating operations and in clearing operations, a second series of actuators for rotating the pinions in carrying, a rock-shaft operable to control selectively the accumulating and the clearing rotation of the pinions by the first mentioned actuators, and means controlled by the second series of actuators to prevent movement of the rock-shaft for a clearing rotation of the pinions when the sum accumulated therein changes to negative.

77. In a calculating machine, a series of denominational calculating pinions, a series of actuators for rotating the pinions in either direction in accumulating operations and in clearing operations, a second series of actuators for rotating the pinions in carrying, a rock-shaft operable to control selectively the accumulating and the clearing rotation of the pinions by the first mentioned actuators, and means controlled by the second series of actuators to introduce the fugitive I in units denominational pinion when the sum accumulated in the pinions changes to negative and also under such condition to prevent movement of the rock-shaft for a clearing rotation of the pinions.

78. In a calculating machine, a series of denominational calculating pinions, a series of actuators for actuating the pinions in either direction in accumulating operations and in clearing operations, a second series of actuators for rotating the pinions in carrying, mechanism for moving said pinions to and from engagement with said respective series of actuators, a member operable to control selectively the accumulating and the clearing rotation of the pinions by the first mentioned actuators and means controlled by the second series of actuators to introduce the fugitive I in units denominational pinion when the sum accumulated in the pinions changes to negative.

79. In a calculating machine, a series of denominational calculating pinions, a series of actuators for actuating the pinions in either direction in accumulating operations and in clearing operations, a second series of actuators for rotating the pinions in carrying, a member operable to control selectively the accumulating and the clearing rotation of the pinions by the first mentioned actuators and means controlled by the second series of actuators to prevent movement of the said member for a clearing rotation of the pinions when the sum accumulated therein changes to negative and also under such condition to introduce the fugitive I in units denominational pinion.

80. A calculating machine comprising a series of rack segments, a series of adjustable devices pivotally mounted on the rack segments each device having a primary rack and a secondary rack, a series of calculating pinions meshing with the racks on the rack segments, means for selectively positioning the series of devices to render operable the primary racks or the secondary racks as desired, and a series of mechanisms differentially controlled in movements in one direction from a uniform starting position for operating the rack segments through the primary racks to rotate the pinions for addition and through the secondary racks to rotate the pinions for subtraction.

81. A calculating machine comprising a series of calculating pinions, actuators for rotating the pinions in one direction for addition and in the other direction for subtraction, a series of carrying racks for rotating the pinions in one direction to carry for addition and in the other direction to carry for subtraction, means for alternately engaging the pinions with the actuators and the carrying racks, a series of controlling levers for the carrying racks, a series of latching devices carried by the levers having one adjustment for addition and another adjustment for subtraction, a series of selectors controlling the latching devices and cooperating with the pinions whether the latter are engaged with the actuators or with the carrying racks, and selective means for conditioning the actuators, the carrying racks and the latching devices for operation in addition or in subtraction.

82. In a calculating machine, the combination of a series of calculating pinions mounted in denominational orders, a series of actuators for rotating said pinions in examples of addition and also in examples of subtraction, means for moving said actuators in one direction from a starting position to operate said pinions in addition, means for moving said actuators in the opposite direction from said starting position to rotate said pinions in subtraction, and a series of racks for rotating said pinions in transferring both in addition and in subtraction.

83. In a calculating machine, the combination of a series of calculating pinions mounted in denominational orders, a series of actuators for rotating said pinions in examples of addition and also in examples of subtraction, means for moving said actuators in one direction from a starting position to operate said pinions in addition, means for moving said actuators in the opposite direction from said starting position to rotate said pinions in subtraction, a series of transfer devices for rotating said pinions in transferring both in addition and in subtraction, and means controlled by said transfer devices to introduce the fugitive 1 in units denominational pinion when the amount represented in the pinions changes from positive to negative.

84. In a calculating machine, a series of calculating pinions mounted in denominational orders, a series of actuators for rotating the pinions in either direction in calculating operations and in clearing operations, two series of racks, means for operating said actuators by either series of racks as desired, and a series of transfer devices cooperating with said pinions irrespective of the direction of rotation of said pinions by said actuators.

85. In a calculating machine, a series of calculating pinions mounted in denominational orders, a single series of actuators for directly engaging and rotating the pinions in either direction in calculating operations and in clearing operations, a series of transfer devices cooperating with said pinions irrespective of the direction of rotation of said pinions by said actuators, and means controlled by said transfer devices to prevent a clearing operation when the amount represented in said pinions changes from positive to negative.

86. In a calculating machine, a series of calculating pinions mounted in denominational orders, a single series of actuators for directly engaging and rotating the pinions in either direction in calculating operations and in clearing operations, a series of transfer devices cooperating with said pinions irrespective of the direction of rotation of said pinions by said actuators, means controlled by said transfer devices to prevent a clearing operation when the amount represented in said pinions changes from positive to negative, and means for conditioning said last named means to permit a clearing operation of said pinions.

87. In a calculating machine, a series of calculating pinions mounted in denominational orders, a series of actuators movable in opposite directions from a single starting position for rotating the pinions in either direction in accumulating operations according as the operations are for positive or negative effects and in clearing operations, a series of transfer devices for rotating the pinions in transferring irrespective of the direction in which said pinions are rotated by said actuators, and means controlled by said transfer devices to introduce the fugitive 1 in units denominational pinion when the amount represented in the pinions changes from positive to negative.

88. In a calculating machine, a series of calculating pinions mounted in denominational orders, a single series of actuators for directly engaging and rotating the pinions in either direction in accumulating operations and in clearing operations, a series of transfer devices for rotating the pinions in transferring irrespective of the direction in which said pinions are rotated by said actuators, and means controlled by said transfer devices to introduce the fugitive 1 in units denominational pinion when the amount represented in the pinions changes from positive to negative, and also to prevent a clearing operation of said pinions until a conditioning adjustment is performed.

89. In a calculating machine, a series of calculating pinions arranged in denominational orders, a series of actuators for rotating the pinions in either direction in accumulating operations and in clearing operations, a series of transfer devices other than said actuators for rotating the pinions in transferring irrespective of the direction of rotation of said pinions by said actuators, a rock shaft, means operable by said shaft to control selectively the accumulating and the clearing rotations of the pinions by said actuators, and parts controlled by said transfer devices to prevent movement of said rock shaft for clearing rotation of said pinions when the amount represented in said pinions changes from positive to negative.

90. In a calculating machine, a series of calculating pinions mounted in denominational orders, a series of actuators for engaging and rotating said pinions in either direction in accumulating operations and also in clearing operations, a series of transfer devices for rotating said pinions in transferring irrespective of the direction of rotation of said pinions by said actuators, mechanism operable to control selectively the accumulating and the clearing rotation of said pinions by said actuators, and means controlled by said transfer devices to introduce the fugitive 1 in units denominational pinion when the amount represented in the pinions changes from positive to negative and also under such condition to prevent movement of said mechanism for a clearing rotation of the pinions.

91. In a calculating machine, a series of segmental racks, a series of pairs of racks pivotally supported by said segmental racks, a series of calculating pinions operative by said segmental racks, means for selectively positioning said pairs of racks for operation of said segmental racks by either set of racks of said pairs of racks, and a series of mechanisms differentially controlled in movements in one direction from a uniform starting position for operating said pairs of racks.

92. A calculating machine comprising a series of segmental racks, a series of calculating pinions operative by said segmental racks, two sets of racks pivotally supported on said segmental racks, means for selectively positioning said sets of racks to operate said segmental racks by either set of said second racks as desired, and differential mechanism controlling operation of said sets of racks to operate said segmental racks.

93. In a calculating machine, a series of calculating pinions mounted in denominational orders, a series of actuators mounted in denominational orders corresponding to said pinions and movable in opposite directions from a single starting position for rotating the corresponding pinions in either direction according as the operations are for positive or negative effects and for clearing operations, a series of transfer devices for rotating the pinions in transferring irrespective of the direction in which said pinions are rotated by said actuators, and means controlled by the transfer device corresponding to the pinion in highest denominational order to introduce the fugitive one in units denominational pinion when the amount represented by said pinions changes from positive to negative.

94. In a calculating machine, the combination of a series of calculating pinions mounted in denominational orders, a series of actuators for rotating said pinions in examples of addition and also in examples of subtraction, means for moving said actuators in one direction from a starting position to operate said pinions in addition, means for moving said actuators in the opposite direction from said starting position to operate said pinions in subtraction, and a series of transfer devices for rotating said pinions in transferring both in addition and in subtraction and controlling the introduction of the fugitive one in units denominational pinion when the amount represented in the pinions changes from positive to negative and vice versa.

95. In a calculating machine, the combination of a series of calculating pinions mounted in denominational orders, a series of actuators for rotating said pinions in examples of addition and also in examples of subtraction, means for moving said actuators in one direction from a starting position to operate said pinions in addition, means for moving said actuators in the opposite direction from said starting position to operate said pinions in subtraction, a series of transfer devices for rotating said pinions in transferring both in addition and in subtraction and controlling the introduction of the fugitive one in units denominational pinion when the amount represented in the pinions changes from positive to negative and vice versa, and means controlled by said transfer devices to prevent clearing operations when the amount represented in said pinions changes from positive to negative.

BIRNEY DYSART.